(12) United States Patent
Galley et al.

(10) Patent No.: US 10,536,402 B2
(45) Date of Patent: *Jan. 14, 2020

(54) CONTEXT-SENSITIVE GENERATION OF CONVERSATIONAL RESPONSES

(71) Applicant: Microsoft Technology Licensing, LLC, Redmond, WA (US)

(72) Inventors: Michel Galley, Seattle, WA (US); Alessandro Sordoni, Montreal (CA); Christopher John Brockett, Bellevue, WA (US); Jianfeng Gao, Woodinville, WA (US); William Brennan Dolan, Kirkland, WA (US); Yangfeng Ji, Atlanta, GA (US); Michael Auli, Menlo Park, CA (US); Margaret Ann Mitchell, Seattle, WA (US); Jian-Yun Nie, Brossard (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,611

(22) Filed: Aug. 24, 2018

(65) Prior Publication Data

US 2018/0367475 A1    Dec. 20, 2018

Related U.S. Application Data

(62) Division of application No. 14/726,562, filed on May 31, 2015, now Pat. No. 10,091,140.

(51) Int. Cl.
- H04L 12/58 (2006.01)
- G06F 17/28 (2006.01)
- G06N 3/04 (2006.01)

(52) U.S. Cl.
CPC .......... *H04L 51/02* (2013.01); *G06F 17/2881* (2013.01); *G06N 3/0445* (2013.01); *G06N 3/0454* (2013.01)

(58) Field of Classification Search
CPC ... H04L 51/02; G06F 17/2881; G06N 3/0445; G06N 3/0454
See application file for complete search history.

(56) References Cited

U.S. PATENT DOCUMENTS

| | | | | |
|---|---|---|---|---|
| 6,728,679 B1* | 4/2004 | Strubbe | ................... | G06F 3/011 704/270.1 |
| 7,256,770 B2* | 8/2007 | Hinckley | ................ | A63F 13/06 345/156 |
| 8,670,979 B2* | 3/2014 | Gruber | ................... | G10L 15/22 704/9 |

(Continued)

*Primary Examiner* — El Hadji M Sall

(57) ABSTRACT

Examples are generally directed towards context-sensitive generation of conversational responses. Context-message-response n-tuples are extracted from at least one source of conversational data to generate a set of training context-message-response n-tuples. A response generation engine is trained on the set of training context-message-response n-tuples. The trained response generation engine automatically generates a context-sensitive response based on a user generated input message and conversational context data. A digital assistant utilizes the trained response generation engine to generate context-sensitive, natural language responses that are pertinent to user queries.

20 Claims, 22 Drawing Sheets

```
Context-Message-Response Triples 402

┌ Context:  Are you a part of the investigation team? 606
       │ Message:  Our company has shops in the mall and we were
  602 ─┤           meeting with insurers. 604
       │ Response: Oh, what's the name of the shop? And how did it
       └           all look? 608

┌ Context:  Doubt it! What do you look like? 612
  610 ─┤ Message:  Look at my pics, I have some there. 614
       └ Response: I don't think I can because I'm on my phone. 616

┌ Context:  Where have you been? 620
  618 ─┤ Message:  Stop grilling me. 622
       └ Response: It's not like that at all. 624
```

(56) References Cited

U.S. PATENT DOCUMENTS

| | | | |
|---|---|---|---|
| 2002/0188666 A1* | 12/2002 | Lemon | H04L 29/06 709/203 |
| 2006/0074670 A1* | 4/2006 | Weng | G06F 17/278 704/257 |
| 2014/0019117 A1* | 1/2014 | Ravi | G06F 17/276 704/9 |
| 2014/0244686 A1* | 8/2014 | Tran | G10L 15/22 707/775 |
| 2016/0085854 A1* | 3/2016 | Blackford | G06F 16/3344 707/738 |

* cited by examiner

FIG. 6

Context-Message-Response Triples 402

602 {
- Context: Are you a part of the investigation team? 606
- Message: Our company has shops in the mall and we were meeting with insurers. 604
- Response: Oh, what's the name of the shop? And how did it all look? 608

610 {
- Context: Doubt it! What do you look like? 612
- Message: Look at my pics, I have some there. 614
- Response: I don't think I can because I'm on my phone. 616

618 {
- Context: Where have you been? 620
- Message: Stop grilling me. 622
- Response: It's not like that at all. 624

FIG. 7

702 Context: Doubt it! What do you look like?

704 Message: Look at my pics I have some there

706 Responses:

I don't think I can cause I'm on my phone [Original response]

I'm just on my phone

No. Prob cause I'm on the phone.

I can't see cz I'm on my phone! Do you have instagram?

maybe later haha, coz I'm just using my phone now yeah, cause I'm soo obsessed with you I think I do too hehe Doubt it! What do you look like?

Oohh that'll be why I can't see it on my phone! xd okay never mind!

Ahh, am on my phone atm :\/

Sorry but I'm on my ipod n I cant do that on here

... ...

I'm on my phone ... I don't know how to find pictures. Do you have a pic?

802 {
- Context: Haha I could sing for ya
- Message: Haha I need a pain pill for the massive sun burn I have my back!!
- Response: I have the pain pills and aloe on your back!! Haha

804 {
- Context: Haha aw kez, making me blush!
- Message: Haha! If ever I need some quotes or anything, I'll know who to call
- Response: I got you, you can trust me! Haha

806 {
- Context: I'm saying. smh
- Message: Are you going to that fireworks thing later today?
- Response: I'm looking forward to it! not sure yet.

808 {
- Context: Yea time flies those were good times tho! You had so much class xd
- Message: Haha I'm better now okk
- Response: That's good to hear!

810 {
- Context: No one ever gets close enough to one to actually see their face!
- Message: Did you take a pic
- Response: Yes I did!

812 {
- Context: Probably not my brother wants me to, won't be up in time though haha
- Message: Oh okay. I've had to set my alarm for 8:45
- Response: I have to set mine at 8 haha

900 Message:
Can you help me do my math homework?

902 Response:
do you need help with your math homework.
I need help with the math homework?!
I'm sure with what I had math homework
you sure with what I had math homework.
of course! I had math homework.
not sure with what I had math homework.
do you need help with your math homework?
do you need help with your math homework!
I sure with what I had math homework.
sure with what I had math homework?!

FIG. 10

1000 Message:
Can you help me do my math homework?

1002 Response:
yeah sure, what kind of math homework.
sure, what do your worksheet
yeah, sure do your worksheet
yeah, sure, what kind of math questions
sure with what do your worksheet
yeah sure, what kind of math worksheet
sure do your worksheet
sure! what do your worksheet
sure what do do your worksheet
need help with your homework worksheet

|  |  | Forward P | Backward P | Lexical P(s\|t) | DSSM | Happy Source | Happy Target | PM |
|---|---|---|---|---|---|---|---|---|
| and skyfall is | brilliant film | 0.333333 | 0.002164 | 0.666666 | 0.000000 | 0.500000 | 0.971187 | 0.063694 |
| claims adele demanded | joan rivers | 1.000000 | 0.005681 | 0.000007 | 0.666666 | 0.875239 | 0.500000 | 0.000000 |
| I love adele | an unpopular opinion | 0.044444 | 0.011428 | 0.600000 | 0.000000 | 0.984439 | 0.898113 | 0.000000 |
| listen to adele | someone like you | 0.022900 | 0.001318 | 0.937500 | 0.937500 | 0.966643 | 0.605680 | 0.000000 |
| older than adele | adele is only | 0.032786 | 0.400000 | 0.666666 | 0.000000 | 0.957236 | 0.875239 | 0.356880 |
| skyfall...best | casino royale | 1.000000 | 0.007782 | 0.000030 | 0.666666 | 0.939048 | 0.806445 | 0.000000 |
| skyfall...best | casino royale is | 1.000000 | 0.083330 | 0.000001 | 0.000000 | 0.939048 | 0.806445 | 0.000000 |
| until adele starts | a spin class | 1.000000 | 0.015260 | 0.000000 | 0.000000 | 0.952390 | 0.887094 | 0.060475 |
|  | love Adele songs | 1.000000 | 0.037735 | 0.000000 | 0.000000 | 0.952390 | 0.801347 | 0.042398 |
| until adele starts | spin class | 1.000000 | 0.003460 | 0.000000 | 0.666666 | 0.952390 | 0.887094 | 0.086993 |
| watch skyfall | bond | 0.200000 | 0.000201 | 0.029475 | 0.333333 | 0.719174 | 0.500000 | 0.036948 |
| you like adele | her songs | 0.200000 | 0.000640 | 0.000050 | 0.666666 | 0.875239 | 0.849480 | 0.430552 |
| your favorite adele | her live | 1.000000 | 0.000778 | 0.000006 | 0.666667 | 0.983249 | 0.745614 | 0.025518 |
| my favorite Adele song |  | 1.000000 | 0.086956 | 0.000000 | 0.950000 | 0.983338 | 0.962931 | 0.039769 |

FIG. 11

| MT $n$-best | BLEU (%) | METEOR (%) |
|---|---|---|
| MT 9 feat. | 3.60 (-9.5%) | 9.19 (-0.9%) |
| CMM 9 feat. | 3.33 (-16%) | 9.34 (+0.7%) |
| ▷ MT + CMM 17 feat. | 3.98 (-) | 9.28 (-) |
| RLMT 2 feat. | 4.13 (+3.7%) | 9.54 (+2.7%) |
| DCGM-I 2 feat. | 4.26 (+7.0%) | 9.55 (+2.9%) |
| DCGM-II 2 feat. | 4.11 (+3.3%) | 9.45 (+1.8%) |
| DCGM-I + CMM 10 feat. | 4.44 (+11%) | 9.60 (+3.5%) |
| DCGM-II + CMM 10 feat. | 4.38 (+10%) | 9.62 (+3.5%) |

CONTEXT-SENSITIVE GENERATION OF CONVERSATIONAL RESPONSES

CROSS REFERENCE TO RELATED APPLICATIONS

This application is a divisional of and claims priority to U.S. application Ser. No. 14/726,562, entitled "Context-Sensitive Generation of Conversational Response," filed May 31, 2015, which is incorporated herein in its entirety.

BACKGROUND

Response generation systems, also known as dialog systems or conversational agents, are becoming increasingly ubiquitous in a variety of computing systems and devices. Response generation systems are designed to interpret natural language input messages received from users and output natural language responses to the users. Current dialog systems are typically rule-based systems utilizing hand-scripted dialog and relying upon statistical algorithms to track state between each step in a conversation. Many components of these dialog systems remain hand-coded. In particular, these systems rely upon labels and attributes defining dialog states.

However, these rule-based systems generally only take into account the user input message and response. These systems do not lend themselves to incorporation of information about preceding conversational context.

Moreover, current response generation systems usually separate dialog management and response generation. Due to the limitations of these systems, the responses output by these systems are often irrelevant, inappropriate, or lacking pertinence to the user input message and/or the conversation. Moreover, these systems are not very robust: they do not adapt well to new domains and they do not scale.

One alternative to rule-based systems that has been proposed is systems that borrow from machine translation techniques by attempting to map phrases in an input sentence to phrases in a lattice of possible outputs. Machine translation may also be referred to as automated language translation. These systems use phrase table lookup to provide the mappings. However, attempting to add contextual information to these machine translation-based systems results in increased sparsity and skew in the phrase table that stores mappings between messages and responses. In other words, injection of context information into these machine translation models results in unmanageable growth of the phrase table at the cost of increased sparsity and skew towards rarely-seen context pairs. In addition in many current statistical approaches to machine translation, phrase pairs do not share statistical weights regardless of their intrinsic semantic commonality

SUMMARY

Examples of the disclosure provide a response generation engine for automatically generating context-sensitive conversational responses. In an example, a computer-implemented method for state-free generation of context-sensitive conversational responses is provided. A user interface device receives a user generated message associated with a current conversation. A response generation engine accesses conversational context data corresponding to the user generated message from a set of context data sources associated with the user. The response generation engine is trained on a plurality of context-message-response n-tuples extracted from at least one source of conversational data. The response generation engine generates a context-sensitive response to the user generated message based on the conversational context data and the user generated message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is an exemplary block diagram illustrating context-message-response triples.

FIG. 7 is an exemplary block diagram illustrating responses extracted from a source of conversational data based on a context-message pair.

FIG. 8 is an exemplary block diagram illustrating additional context-message-response triples mined from sources of conversational data.

FIG. 9 is an exemplary block diagram illustrating biasing responses based on a context that includes a mood of the user.

FIG. 10 is another exemplary block diagram illustrating biasing responses based on a context that includes a mood of the user.

FIG. 11 is an exemplary block diagram illustrating contextual conditioning of responses.

Corresponding reference characters indicate corresponding parts throughout the drawings.

DETAILED DESCRIPTION

Figure 1:
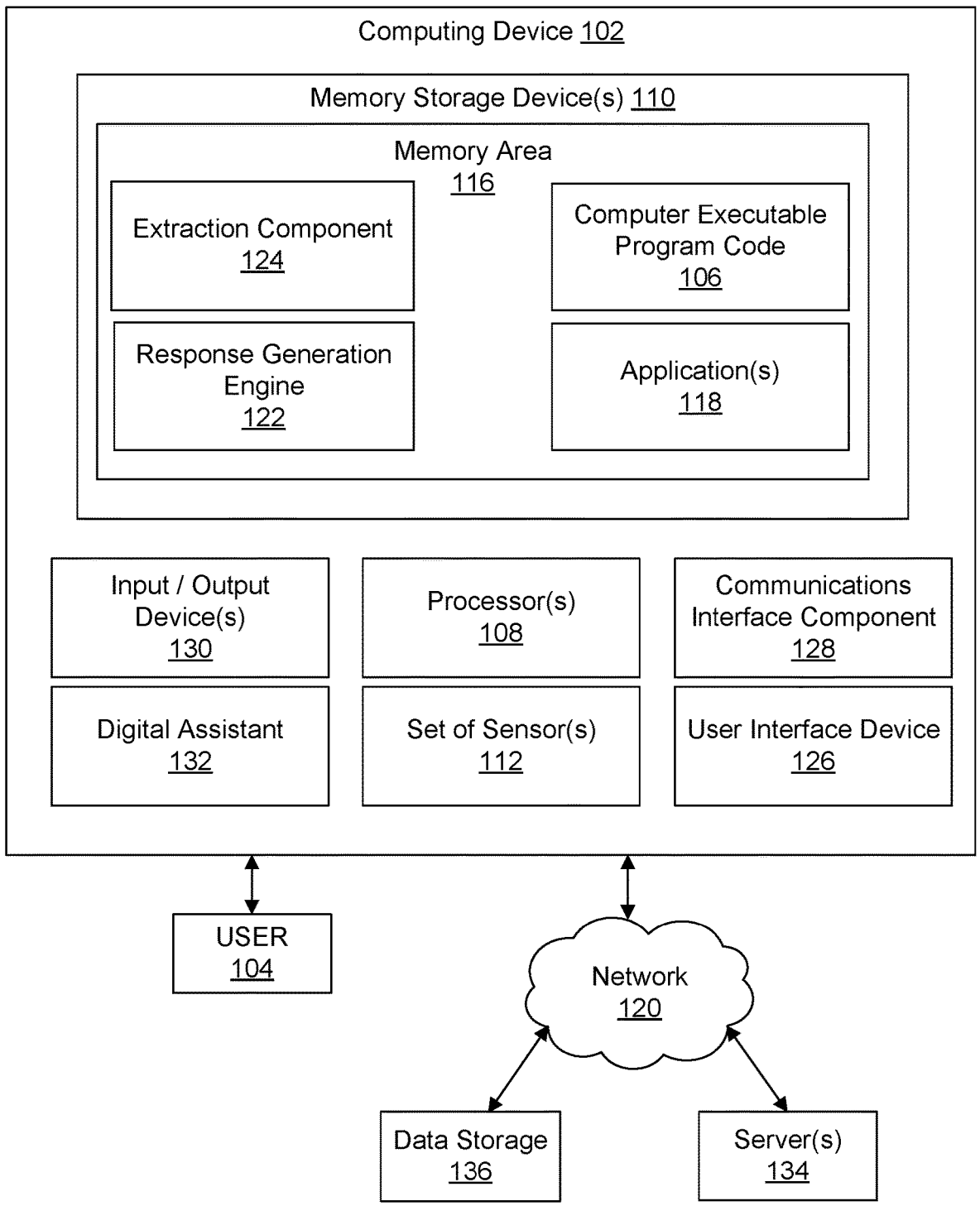
FIG. 1 is an exemplary block diagram illustrating a computing device for automatic generation of context-sensitive conversational responses.

Referring to the figures, examples of the disclosure enable a context-sensitive response generation system for creating conversational, machine-generated responses to user generated messages based on conversational context data. Context-sensitive responses are more natural, human-like responses. The context-sensitive responses are more appropriate, pleasing, and interesting to the user.

Aspects of the disclosure enable a response generation engine for automatically generating context-sensitive, conversational responses to user input messages. The response generation engine provides state free or implicit state generation of local dialog interactions.

In some examples, the response generation engine conforms to a machine learning model. This response generation engine enables improved user efficiency and accuracy of communication between users and computing devices and/or applications utilizing the response generation system. The responses generated by the response generation system are higher quality, better, more accurate responses relative to the user generated messages. This reduced error rate improves the user experience when interacting with an application or system utilizing this response generation system. The machine learning model enables a response generation system that is more data-driven and less hand-coded dialog processing. Moreover, the neural network architecture provides robustness to sparsity.

In other examples, the response generation engine includes a neural network model. Neural network architecture is used to address sparsity issues that arise when integrating context information into statistical models, allowing the response generation engine to take into account previous dialog utterances, as well as other non-linguistic context data. Furthermore, the neural network model is completely latent and directly optimized towards end-to-end performance.

Some aspects of the disclosure provide a response generation engine training component. The response generation training component accesses context-message-response data triples extracted from one or more sources of conversational data. The response generation engine trains the response generation engine using context-message-response data triples that conform to a selected context and message data pair to form a trained response generation engine. The use of context-message-data pairs to train the response generation engine enables the response generation system to generate context-sensitive responses. Context-sensitive responses are more appropriate and pertinent to user generated input messages. This improved quality and accuracy of machine generated responses enables more efficient communication between users and the response generation systems, as well as improved overall system performance and reduced error rate.

Other aspects of the disclosure provide an extraction component. The extraction component identifies and extracts context-message-response triples from one or more social media sources of conversational data. A social media source of conversational data may include any social media source including message and response data pairs. Some examples utilize social media sources, such as, but without limitation, social networking data feeds or any other social media source. The social media data may be in any format, including, but not limited to, a text format, an audio format, a video format, or a combination format. A combination format includes two or more formats. For example, social media data may include text and audio.

The conversational data retrieved from a source of conversational data may be in a text format, a video or visual format, an audio format, or any combination of these formats. For example, conversational data may include both video and audio. In other examples, conversational data may be in a format that includes video images, audio files, and textual data.

The extraction component enables efficient utilization of social media as a corpus of message and response data for utilization in training the response generation engine. This aspect enables improved accuracy in generating and/or selecting responses for output.

The extraction component further enables automatic extraction of context-message-response data n-tuples to form test data, instead of relying on manual, human generated scripts train the response generation engine, where n is an integer. In the examples described herein, the n-tuples are triples.

However, it should be understood that any number of items may form the context-message-response data n-tuples according to requirements of the examples. For example, the context data may be absent or a null value. In such cases, the context-message-response n-tuples is a message-response data pair instead of a triple.

This aspect further reduces the time, expense, and burden on users required for training the response generation system. The automatic extraction of training data enables greater efficiency, improves user interaction with the system, and overall greater accuracy in response generation.

Still other aspects of the disclosure provide a context data derivation component. The context data derivation component gathers and/or derives conversational context data from a plurality of context data sources associated with the user. In some examples, conversational context data includes both linguistic context data and non-linguistic context data. Linguistic context data includes message and response data pairs preceding the user generated message within the current conversation. Non-linguistic data includes data describing the user and the environment associated with the user. This use of context data improves the performance and accuracy of the response generation engine while reducing the error rate. Moreover, the response generation engine is able to capture context information from multiple sources while avoiding unmanageable growth of model parameters.

In other examples, the context-sensitive response generation engine overcomes the challenges of context sensitive response generation by using continuous representations or embeddings of words and phrases to compactly encode semantic and syntactic similarity. This response generation engine may utilize embedding-based models. The response generation engine may model the transitions between consecutive utterances and capture long-span dependencies in a domain where traditional word and phrase alignment is difficult.

Moreover, the response generation engine improves the accuracy of responses and functions performed by digital assistance. For example, when a user says "I need more" in the context of driving on a low tank of gas, the digital assistant makes a more accurate determination that the user message "I need more" is associated with a desire or interest in purchasing more gasoline for the car. The digital assistant is able to make a more pertinent response, such as, "Do you want locations of nearby gas stations?" or "Do you want to find a gas station now?" This improves the user experience and overall efficiency of the personal digital assistant.

Referring now to FIG. 1, an exemplary block diagram illustrating a computing device for automatic generation of context-sensitive conversational responses is shown. System 100 is a dialog system for automatically generating responses to user input messages based on conversational context data.

In the example of FIG. 1, the computing device 102 associated with a user 104 represents any device executing computer executable program code 106 (e.g., as application programs, operating system functionality, or both) to implement the operations and functionality associated with the computing device 102. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, industrial control devices, wireless charging stations, and electric automobile charging stations.

In other examples, the computing device 102 may be embodied within a robot, a vehicle, a wearable computing device, an appliance, or any other device. Additionally, the computing device 102 may represent a group of processing units or other computing devices.

In some examples, the computing device 102 includes one or more processor(s) 108, one or more memory storage device(s) 110, a set of sensors 112, input/output device(s) 130, and digital assistant 132. The one or more processor(s) 108 include any quantity of processing units, and is programmed to execute the computer executable program code 106 for implementing aspects of the disclosure. The computer executable program code 106 includes instructions. The instructions may be performed by the one or more processor(s) 108 within the computing device 102, or performed by a processor external to the computing device 102. In some examples, the one or more processor(s) are programmed to execute instructions such as those illustrated in the figures, such as, FIG. 8, FIG. 9, FIG. 10, and FIG. 11.

In some examples, the processor(s) 108 represent an implementation of analog techniques to perform the operations described herein. For example, the operations may be performed by an analog computing device and/or a digital computing device.

The computing device 102 further has one or more computer readable storage media, such as the memory area 116. The memory area 116 includes any quantity of media associated with or accessible by the computing device 102. The memory area 116 may be internal to the computing device 102 (as shown in FIG. 1), external to the computing device (not shown), or both (not shown). In some examples, the memory area 116 includes read-only memory and/or memory wired into an analog computing device.

The memory area 116 stores, among other data, one or more application(s) 118. The application(s) 118, when executed by the processor, operate to perform functionality on the computing device 102. Exemplary application(s) 118 include conversational agents, mail application programs, web browsers, calendar application programs, address book application programs, messaging programs, media applications, location-based services, search programs, etc.

The application(s) 108 may communicate with counterpart applications or services, such as web services accessible via a network 120. For example, the application(s) 118 may represent downloaded client-side applications that correspond to server-side services executing in a cloud.

The memory area 116 further stores one or more computer-executable components. Exemplary components include, without limitation, a response generation engine 122 and an extraction component 124. In other examples, the memory area 116 further stores a response generation engine training component and a context data derivation component.

The response generation engine 122, when executed by the processor of the computing device 102, causes the processor to generate a context-sensitive response to a conversational user input message. The machine-generated response may include one or more formats. In some examples, a format of a response may include, without limitation, a text format, a speech format, a gestural format, a graphical format, an actuation format response, or any other type of format for an output response.

A text format response may include a response in a typed or written format including letters, numbers, and/or symbols. A text format may include printed out response on paper, as well as text displayed on a display screen.

An audio format for a response is a response consisting of audible sounds. An audio format, in some examples, includes a spoken response/simulation of human speech in one or more languages. A speech format response may include a response in any language. For example, but without limitation, a speech response may be provided in English, Spanish, Cantonese, Japanese, or any other language. The non-verbal sounds may include noises indicating success or failure in a competition, successful completion of a task, or occurrence of an event. In some examples, an audible format response may include non-verbal sounds, such as beeps, whistles, door knocks, door bells, car horn, animal sounds, fireworks sounds, sound of applause, baby sounds, engine sounds, chimes, buzzers, phone ring tones, music, or any other type of non-verbal sounds. A gestural format response may include a hand gesture, a body movement, a facial expression, as well as any other type of movement or motion associated with a robot, avatar, graphical simulation of a face, graphical manipulation of a face, or any other movement or motion associated with a machine or graphical representation of an entity, application, or computing device. Graphical manipulation of a face may include any alteration or changes to a digital image.

A graphical format response may include any change or alteration of a graphical image associated with a display. A change of a graphical image may include changing a color, size, shape, orientation, image, or any other image change. In some examples, a graphical response may include a change, movement, or simulation of a graphical facial expression of an embodied conversational agent, avatar, or other graphical image on a display screen. Other examples of a graphical response include changing a desktop theme, background, or color.

An actuation format response may include any type of movement or actuation of a mechanical device. For example, an actuation or motor function response may include a robotic arm may wave or simulate a "thumbs up"

gesture". In other examples, an actuation/motor response may include changing a thermostat setting, adjusting lighting levels, opening or shutting a door, or any other type of mechanical movement of a device.

A response may also include a combination format response. A combination format response is a combination of two or more different formats. In other words, a combination format response includes a combination of two or more of a text format response, a speech format response, a gestural format response, a graphical format response, and/or an actuation format response.

For example, a combination format context-sensitive conversational response may include a combination of a graphical format, a speech format, and a text format for the response. In this example, a user input message "I aced it" in a context of "exam" may generate a response that includes audio/spoken words "great job" with a graphic showing a face smiling and displayed text spelling "congratulations".

In other examples, a combination format response to a user input message "turn it up" in a context of "favorite song" may generate a combination format response that include an audio format, a graphical format, and an actuation format. In this example, the combination format response may include a change in a graphic display showing the volume level of a music player, an actuation function to increase the volume of a music player, and the audible change in the music volume.

The memory area 116 may optionally store an extraction component 124. The extraction component 124 is a component for context-message-response data triples from one or more sources of conversational data. A source of conversational data may include social media sources, as well as one or more databases storing conversational data.

In some examples, the extraction component uses an extraction algorithm to cover the space of reasonable responses to be mined from sources of conversational data. The extraction component 124 mines other responses that fit a selected context and message pair ($c_t$, $m_t$) associated with a given test context-message-response triple.

In a non-limiting example, the extraction component selects a set of two or more candidate response triples using an information retrieval system. The information retrieval system is calibrated to select candidate response triple for which both the message and the response are similar to a selected message and response.

The computing device 102 includes a user interface device 126 for receiving user generated messages from a user. In some examples, the user interface device 126 includes a graphics card for displaying data to the user 104 and receiving data from the user 104. The user interface device 126 may also include computer-executable instructions (e.g., a driver) for operating the graphics card. Further, the user interface device 126 may include a display (e.g., a touch screen display or natural user interface) and/or computer-executable instructions (e.g., a driver) for operating the display. The user interface device 126 may also include one or more of the following to provide data to the user and/or receive data from the user: speakers, a sound card, a camera, a microphone, a vibration motor, one or more accelerometers, a BLUETOOTH brand communication module, global positioning system (GPS) hardware, a motion detector, an infrared sensor, a pressure sensor, a barometric pressure sensor, accelerometer, pedometer, an orientation sensor, audio sensors, medical sensor, physical activity sensor, and/or a photoreceptive light sensor. In some examples, the user 104 may input commands or manipulate data by moving the computing device 102 in a particular way.

In some examples, the computing device 102 includes a communications interface component 128. The communications interface component 128 includes a network interface card and/or computer-executable instructions (e.g., a driver) for operating the network interface card. Communication between the computing device 102 and other devices may occur using any protocol or mechanism over any wired or wireless connection. In some examples, the communications interface component 128 is operable with short range communication technologies, such as by using near-field communication (NFC) tags.

Input/output device(s) 130 includes one or more devices for inputting data into the computing device 102 and/or one or more devices for outputting data to the user 104. Input device(s) may include, without limitation, a keyboard, a mouse, a touch screen, a microphone, a camera, a graphical user interface, a pressure sensor, a touch sensor, or any other type of input device. Output device(s) may include, without limitation, a display screen, a graphical user interface, a speaker, an actuator associated with a robot or other mechanical device, or any other type of output device.

The computing device 102 may optionally include a digital assistant 132. A digital assistant 132 may also be referred to as a personal information manager. The digital assistant 132 is a component for managing a user's personal information, telephone functions, schedules, appointments, contacts, favorite restaurants, travel plans, frequent destinations, and any other personal information. Digital assistant 132 includes a conversational agent or other response generation system capable of communicating with the user 104 using natural language responses to user queries and messages.

In this non-limiting example, the computing device 102 may optionally connect to one or more server(s) network 120. The network 120 may include any type of network connection. In one example, the network 120 may be the Internet, an intranet, an Ethernet, or other wireless or hard-wired connections by which the computing device 102 may send and receive data associated with one or more server(s) 134. However, other examples do not require network 120.

Furthermore, in this non-limiting example, the response generation system 100 manages dialog and response generation tasks together. In other words, the response generation system 100 does not separate or handle response generation apart from dialog management enabling greater accuracy of the generated responses.

The computing device 102 may also optionally store and/or access data stored on remote data storage 136. The data storage 136 may be any type of data storage system, such as, but without limitation, a cloud storage system.

The computing device 102 may optionally include a digital assistant 138. A digital assistant 138 may also be referred to as a personal information manager. The digital assistant 138 is a component for managing a user's personal information, telephone functions, schedules, appointments, contacts, favorite restaurants, travel plans, frequent destinations, and any other personal information. Digital assistant 138 includes a conversational agent or other response generation system capable of communicating with the user 104 using natural language responses to user queries and messages.

In some examples, a response generation system accesses conversational context data corresponding to a user generated message from a set of context data sources associated with the user. The response generation system generates a context-sensitive response to the user generated message based on the conversational context data and the user generated message.

Figure 2:
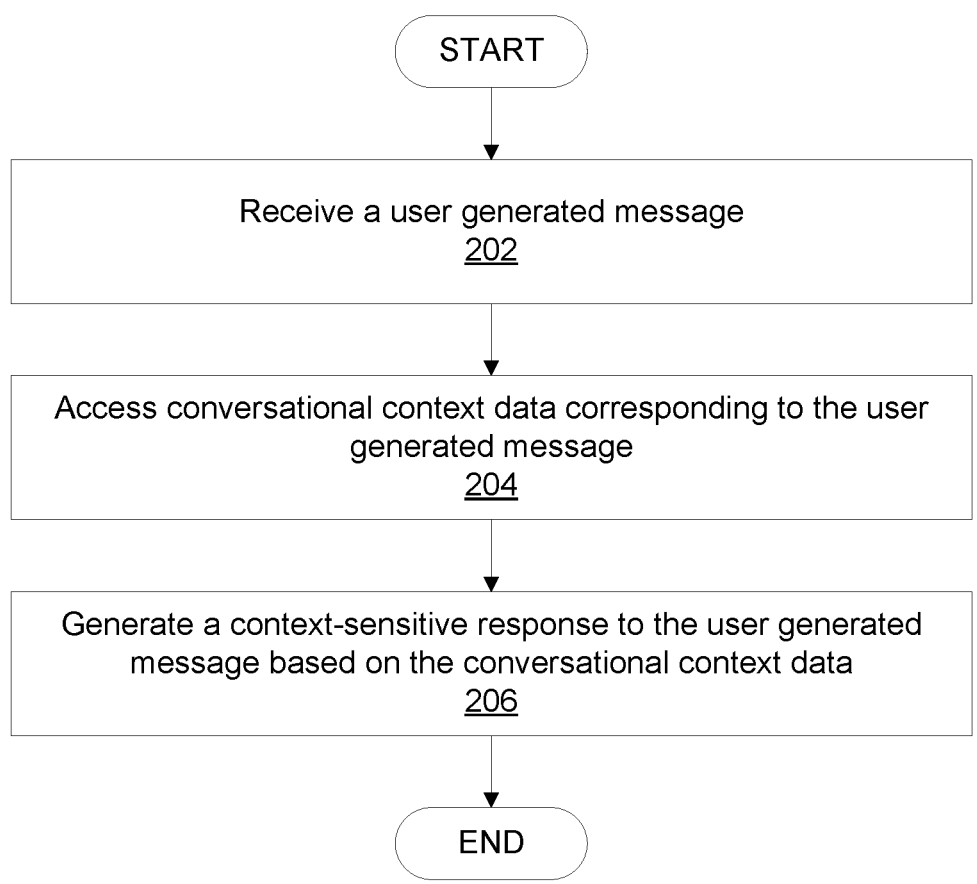
FIG. 2 is a flow chart illustrating operation of the computing device to generate a context-sensitive response to a user message.

FIG. 2 is a flow chart illustrating operation of the computing device to generate a context-sensitive response to a user message. The process depicted in FIG. 2 may be implemented by a computing device, such as, but without limitation, computing device 102 in FIG. 1 and/or user device 302 in FIG. 3 shown below.

The process begins by receiving a user generated message at 202. Conversational context data corresponding to the user generated message is accessed at 204. A context-sensitive response to the user generated message is generated based on the conversational context data at 206 with the process terminating thereafter.

In this example, a response is generated in real-time. However, in other examples, a response may be selected from a database of pre-generated responses.

Figure 3:
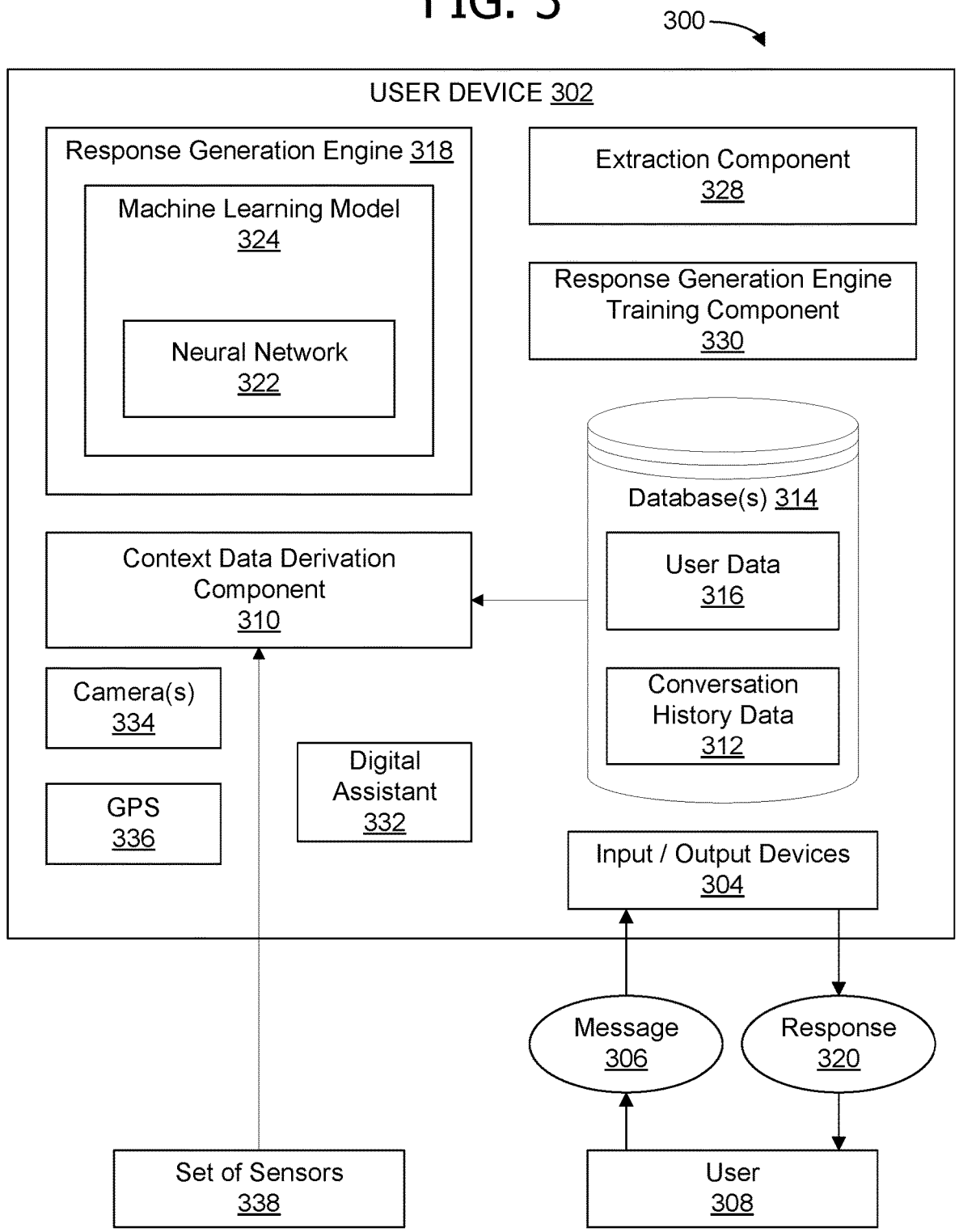
FIG. 3 is an exemplary block diagram illustrating a response generation system.

FIG. 3 is an exemplary block diagram illustrating of a response generation system. The response generation system 300 may be implemented on at least one user device 302. The user device 302 is a computing device, such as, but not limited to, computing device 102 in FIG. 1.

Input/output device(s) 304 include one or more input device(s) for receiving a user generated input message 306 from a user 308. The input/output device 304 may include one or more microphone(s) for receiving audio input, keyboard for receiving text input messages, a touch screen, one or more video camera(s) for receiving visual/gestural input messages, as well as any other input devices.

The message 306 is a conversational message generated by the user 308 during a current conversation between the user 308 and the user device 302. The message 306 may be a text message, an audio message, a visual message, a gestural message, or any other type of message. The message 306 is associated with a conversational context.

Context Data Derivation Component 310 captures conversational context data associated with the input message 306. In some examples, the conversational context data includes linguistic context data. Linguistic context data includes linguistic context associated with the current conversation. Linguistic context data includes message and response data pairs preceding the user generated message 306 within the current conversation. A message and response data pair is a user generated message and a response to that message. The message and response may also be referred to as a message-response pair. Linguistic context data may be any prior discourse up to any length.

In other examples, linguistic context data may include message and response data pairs occurring in a prior conversation. A prior conversation may be a conversation associated with the user 308 that occurred on a different day or at a different time on the same day as the current conversation.

Context data derivation component 310 retrieves or derives the linguistic data from a database, such as database(s) 314, storing conversation history data 312 for the user 308. The conversation history data 312 includes message-response pairs occurring in the current conversation, as well as in past conversations in which the user 308 was a participant in the conversation.

The ability to take into account previous utterances assists the response generation engine 318 in improving the quality of machine generated responses and keeping conversations active and engaging. For example, if linguistic context data includes the context "because of your game" and the user input message is "I'm on my way now", the response generation engine 318 may generate the context-sensitive response "good luck". The response "good luck" in this example, is motivated by the reference to "your game" in the linguistic context data.

In other examples, conversational context data includes non-linguistic data. Non-linguistic context data involves grounding in the physical or virtual world. Non-linguistic context data may include information about the user, a physical environment, or a virtual environment. Non-linguistic data includes, without limitation, geographic location, time information, likes and dislikes of the user, orientation of the user or a user device, speed of a vehicle, temperature, weather, or any other contextual information associated with the user and/or environment of the user.

Context data derivation component 310 captures non-linguistic data from a set of sensors 338 associated with the user 308 in real-time, during the current conversation. The set of sensors may include one or more sensor devices for gathering signals and/or sensor data. For example, the set of sensors 338 may include one or more sensors, such as camera(s), audio sensor(s)/microphone(s), global positioning system (GPS) sensor, infrared sensor(s), photoreceptive light sensor(s), pressure sensor(s), motion sensor(s), orientation sensor(s), temperature sensor(s), medical sensor(s), physical activity sensor(s), and/or speed sensor(s)/accelerometer(s). A medical sensor may be any type of sensor or monitor for measuring or gathering medical data. For example, a medical sensor may include a sensor for detecting heart rate, blood pressure, body temperature, blood sugar, blood oxygen levels, or any other medical related data. A physical activity sensor is a device for gathering data associated with physical activity, such as a pedometer or other device for monitoring pace, distance, heart rate, calories burned, etc.

The set of sensor(s) may include any combination of sensors. For example, the set of sensors 338 may include cameras, audio sensors, pressure sensors, and a GPS sensor. In another example, the set of sensors 338 may include temperature sensors, pressure sensors, orientation sensors, accelerometers, and a GPS sensor. In another example, the set of sensors 338 may include only cameras and audio sensors.

The context data derivation component 310 derives non-linguistic context data from the sensor data received from set of sensors 338. For example, context data derivation component 310 may derive a context of "slow speed/cautious automobile travel in cold weather" based on data from a GPS, accelerometer/speed sensor, orientation/skid sensors, and temperature sensors.

In still other examples, the context data derivation component 310 derives non-linguistic context data from user data 316 stored in one or more database(s) 314. The user data 316 may include preferences data, contacts data, health data, user activity data, calendar data, activities data, work data, hobby data, and daily routine data.

Preferences data includes a user's likes and dislikes. Preferences data may include, but not limited to, favorite foods, favorite songs, favorite movies, and favorite restaurants, favorite sports, favorite sports teams, favorite players, and favorite books. Preference data may also include disliked songs, disliked foods, etc.

Contacts data may include names, addresses, phone numbers, email addresses, and/or other information for friends, family members, acquaintances, business associates, etc.

Health data may include information associated with the health and/or physical fitness of the user. Health data may include exercise routines, special diets, allergies, medications, names of doctors, medical appointments, data from health monitoring devices, or any other information related to the health and physical fitness of the user 308. A health monitoring device may include any device for monitoring the health of a user. A health monitoring device may monitor, for example, blood pressure, blood oxygen, heart rate, blood sugar, body temperature, pedometer, or any other data associated with health monitoring.

Calendar data includes any dates, appointments, birthdates, anniversaries, holidays celebrated by the user 308, as well as any other significant dates. User activity data may include the user's activities, such as sports activities, exercise activities, workout schedule, amount of time spent exercising, workout goals, distance walked or jogged, calories burned during a workout, etc.

Response generation engine 318 generates a response 320 to user generated message 306 that is sensitive to the context of the current conversation. In some examples, response generation engine 318 includes a machine learning model 324. The machine learning model 324 may include a neural network model 322. In other examples, response generation engine 318 includes a metric 326 for generating the response.

In some examples, the neural network 322 uses Recurrent Neural Network Language Model (RLM) architecture. The neural network 322 encodes past message-response information in a hidden continuous representation. The past conversational message-response information is then decoded by the RLM using past conversational message-response information to promote plausible responses that are simultaneously fluent and contextually relevant.

In this non-limiting RLM model architecture, the response generation engine 318 architecture is completely data-driven and can easily be trained end-to-end using unstructured conversational data without requiring human annotation, scripting, or automatic parsing.

The neural network 322 architecture for response generation is both context-sensitive and data-driven. The neural network 322 can be trained from end to end on massive amounts of social media conversational data. In this example, the response generation engine 318 utilizes the neural network 322 model to improve open-domain response generation in conversations.

In some examples, the Recurrent Neural Network Language Model of the neural network 322 uses continuous representations to estimate a probability function over natural language sentences. In other examples, the neural network includes a set of conditional RLMs where contextual information, such as past utterances by the user, is encoded in a continuous context vector to help generate the response 320.

In another example, the response generation engine 318 concatenates the vector representing the lexical embeddings of the context with vector representing the lexical embeddings of the message, keeping the information about the two separate. The response generation engine 318 learns the response patterns from those embeddings using the neural network 322.

The machine learning model 324 differs from current models in the way the context vector is constructed. The machine learning model 324 utilizes a context vector that is learned along with the conditional RLM that generates the response. Additionally, the learned context encodings do not exclusively capture content associated words. Indeed, even "stop words" can carry discriminative power in this task; for example, all words in the utterance "how are you?" are commonly characterized as stop words, yet this is a content associated dialog utterance.

A context data derivation component 310 derives conversational context data from a set of context data sources associated with the user. The set of context data sources may include, without limitation, conversation history data 312, user data 316, and/or set of sensors 338. The conversational context data may include linguistic context data and non-linguistic context data associated with the user generated message.

In some examples, response generation engine 318 accesses conversational context data gathered or generated in real-time by context data derivation component 310 during the current conversation. In other words, response generation engine 318 generates the context-sensitive response 320 to the user generated message 306 based on the conversational context data and the user generated message 306. The context-sensitive response 320 is returned to the user 308 via input/output device(s) 304. The response 320 may be returned via a display screen, a speaker, speech synthesizer, a mechanical device or member of a robot or robotic device capable of movement or actuation, or any other type of device for generating a response.

The response generation engine 318 in some examples is trained on context-message-response data triples extracted from one or more sources of conversational data. The extraction component 328 extracts context-message-response triples from one or more sources of conversational data. A source of conversational data may include a social media source, transcribed phone conversations, conversations extracted from online forums, instant messaging, video conferencing, or any other sources of conversational data. A context-message-response triple is a user generated message, a response to that message, and a conversational context associated with that message and response.

The extraction component 328 identifies one or more context-message-response triples from a plurality of context-message-response triples. In some examples, the extraction component 328 identifies context-message-response triples corresponding to a selected context-message data pair. In other words, context-message-response triples sharing the same context or having a similar context are selected context-message pair are selected.

For computational efficiency and to alleviate the burden of human evaluators, in this example, the context sequence (c) is restricted to a single sentence. However, in other examples, the context sequence may include multiple sentences of varying length.

In this example, the dataset is composed of context-message-response triples consisting of three sentences. In other examples, the dataset may include more than three sentences, such as when the context size is greater than one (1).

The extraction component in this non-limiting example mines context-message-response triples where context, message, and response were generated by no more than two users. In other examples, the extraction component mines triples where context and response were generated by the same user where the context size is one (1).

To minimize noise, the extraction component selects triples that contain at least one frequent bigram that appears more than 3 times in the corpus.

The extraction component 328 selects the identified context-message-response triples from the plurality of context-message-response triples to form a training set of context-message-response data triples. A response generation engine training component 330 trains the response generation engine 318 using the selected context-message-response triples.

The context-message-response triples used to train the response generation engine 318 are extracted from source(s) of conversational data, such as, but without limitation, social media sources. In some examples, the response generation engine 318 is trained from end to end on large quantities of un-structured social media conversations. In other words, some examples enable training open-domain response generation systems that emulate human conversation by leveraging the vast quantities of conversational exchanges now available on social media websites, such as, but without limitation, social networking data feeds, video chat, and video conferencing.

In other examples, the machine learning model 324 is trained on a subset of context-message-response triple data. The vocabulary "V" consists of the most frequent words. In one non-limiting example, the vocabulary consists of fifty thousand (50K) words.

In order to speed up training, the response generation engine training component 330 may use a Noise-Contrastive Estimation (NCE) loss, which avoids repeated "summations over V words" by approximating the probability of a target word. Parameter optimization may be performed using a mini-batch size of 100 and a learning rate $\alpha=0:1$, which works well on held-out data. In order to stabilize learning, the gradients may be clipped to a fixed range $[-10; 10]$.

The parameters of the neural network 322 models may be sampled from a normal distribution "N", while the recurrent weight ($W_{hh}$) is initialized as a random orthogonal matrix and scaled by 0.01. To prevent over-fitting, performance may be evaluated on a held-out set during training and stopped when the objective increases. The size of the RLM hidden layer, in this example, is set to $K=512$, where the context encoder is a 512, 256, 512 multilayer network. The bottleneck in the middle compresses context information that leads to similar responses and thus achieves better generalization. The last layer embeds the context vector into the hidden space of the decoder RLM.

In other examples, the response generation engine 318 is a data-driven model capable of communicating conversationally with the user 308. The response generation engine 318 may be constructed and trained using context-message-response triples extracted from social media conversations using statistical machine translation techniques. For example, a social media status post by a user may be translated into a plausible looking response by the extraction component 328.

This trained response generation engine 318 is able to generate responses that are context-sensitive and more accurate, appropriate, and pertinent to a user message that previous response generation systems.

The user device 302 may optionally include a digital assistant 332. The digital assistant 332 may include any type of hardware and/or software component for managing user data. The user data managed by the digital assistant may be any type of user data, including contacts, addresses, phone numbers, schedules, directions, schedules, appointments, or any other information. The digital assistant 332 may also include functionality associated with managing/operating phone functions, appointment reminders, providing driving directions, identifying restaurants or entertainment venues, managing a music player, controlling a thermostat or other environmental systems, or other functionality.

In this example shown in FIG. 3, the set of sensors 338 are depicted as outside or separate from the user device 302. However, in other examples, one or more sensors in the set of sensors 338 may be located on or incorporated within the user device 302. In other words, the pressure sensors, temperature sensors, cameras, microphones, audio sensors, orientation sensors, as well as any other sensor that may be included within set of sensors 338 may optionally be included within user device 302.

For example, the user device 302 may optionally also include one or more camera(s) 334, as well as a global positioning system (GPS) 336 incorporated within the user device 302. The external set of sensors 338 as well as the internal camera(s) 334 and GPS 336 may be accessed by the digital assistant 332 to obtain driving directions, information associated with the user 104, current location of the user 104, or other context information associated with the user and/or the current conversation.

Figure 4:
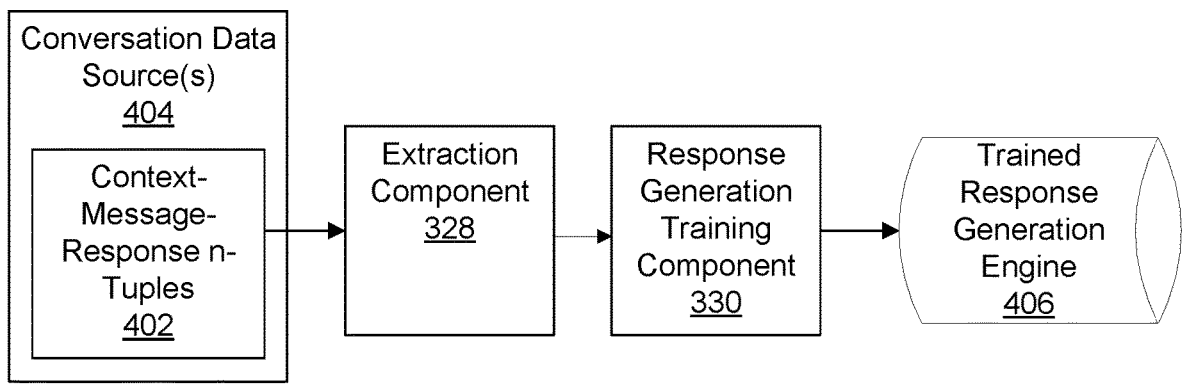
FIG. 4 is an exemplary diagram illustrating training a response generation engine.

FIG. 4 is an exemplary diagram illustrating training a response generation engine. In this example, the extraction component 328 extracts context-message-response n-tuples 402 from one or more conversation data source(s) 404. A context-message-response n-tuple is a data set including data associated with a response. In some examples, the context-message-response n-tuples include a message and response data pair. In other examples, the context-message-response n-tuple includes a message, response, and context data triple.

The response generation engine training component 330 accesses the context-message-response n-tuples 402. The response generation engine training component 330 trains a response generation engine using the extracted context-message-response n-tuples 402 to form trained response generation engine 406.

Figure 5:
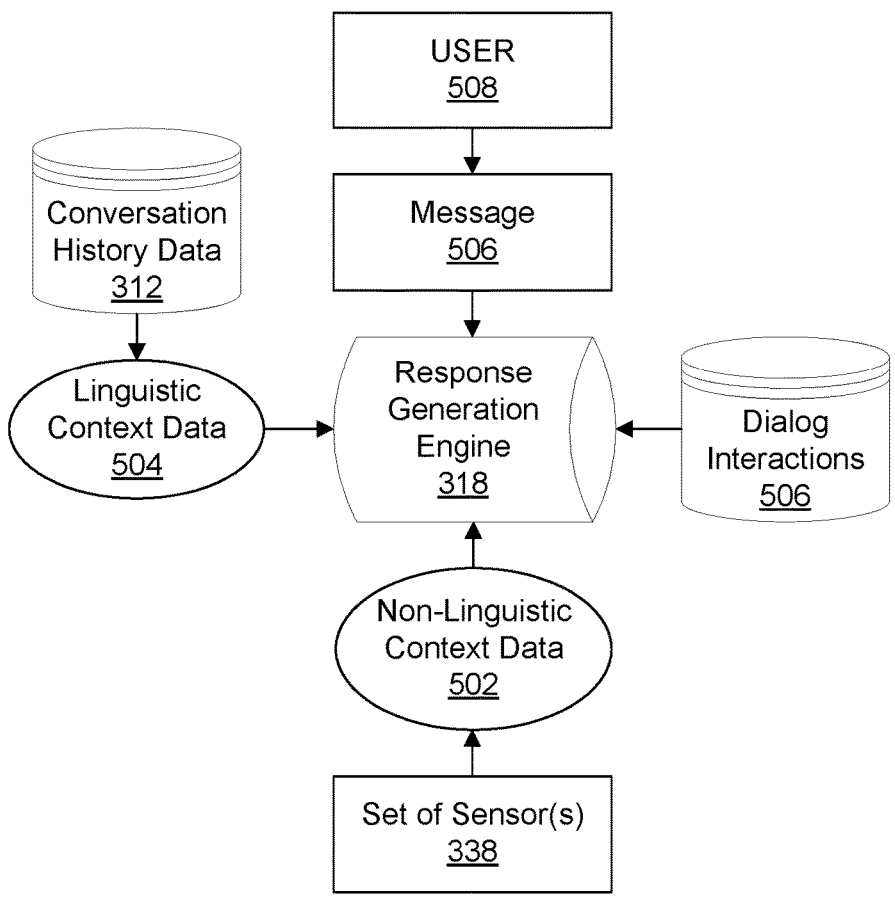
FIG. 5 is an exemplary block diagram illustrating generation of a context-sensitive response.

FIG. 5 is an exemplary block diagram illustrating generation of a context-sensitive response. The response generation engine generates a response to a message 506 created by a user 508 based on conversational context data. The conversational context data may include non-linguistic context data 502 and linguistic context data 504. The context data derivation component accesses linguistic context data 504 from conversation history data for the user. The context data derivation component 210 derives non-linguistic context data 502 from sensor data received from the set of sensor(s).

The response generation engine may generate the response during run-time. In other words, in this example, the response is not a pre-generated or canned response. The response generation engine generates this response dynamically, in real-time during the current conversation.

In other examples, the response generation engine uses the conversational context data to select a pre-generated response from a database, such as database of dialog interactions 506.

FIG. 6 is an exemplary diagram illustrating context-message-response triples data sets. Context-message-response triples are exemplary sets of data extracted from one or more source(s) of conversational data.

A given context-message-response triple in context-message-response triples may include a message, a corresponding response to the message, and a context of the message. In this example, context-message-response triple 602 includes a human generated message 604, a context 606 of the message 604, and a human generated response 608 to the message 604. Context-message-response triple 610 includes context 612, message 614, and response 616. Context-message-response triple 618 includes context 620, message 622, and response 624.

In this example, context-message-response triples are extracted from a social media source, such as, but not limited to, social networking data feeds. The extraction component identifies and selects or filters the context-message-response triples in accordance with a selected message and a selected context to generate a set of multi-reference responses.

In some examples, the extraction component mines sets of multiple reference strings. This approach consists of mining conversational responses from social media or any other source of conversational data.

In this non-limiting example, the extraction component identifies conversational triples (context, status, response), in social media and/or other sources of conversational data. In some social media sources, for example, these triples are identified by the fact that any social media user can address her message to a particular user. Millions of conversational triples may be mined in this manner.

Context in this example, may represent a chain of arbitrary length comprising message-response pairs preceding a given message and response occurring in the conversation. Context may also include non-linguistic information, such as location, date, time of day and other externally available information that is pertinent to the conversation. This extraction technique provides at least one training response for each context-message pair.

In another example, the extraction component mines other responses that fit a selected context and message pair. To this end, the extraction component selects a large number of candidate triples (the more the better) using an information retrieval system. To minimize the risk of obtaining low scores from human evaluation, the extraction component is calibrated in order to select candidate triples for which both the message and the response are similar to the original or selected message and response pair.

FIG. 7 is an exemplary block diagram illustrating responses extracted from a source of conversational data based on a context-message pair. An extraction component extracts one or more responses from a source of conversational data that correspond to a selected context and message. In this non-limiting example, a selected context 702 is based on a prior statement "Doubt it! What do you look like?" The selected message 704 is a user generated message "Look at my pics. I have some there." The set of responses 706 are responses identified from the context-message-responses having the same or similar context and message as context 702 and message 704.

FIG. 8 is an exemplary block diagram illustrating additional context-message-response triples mined from sources of conversational data. Context-message-response triples 802, 804, 806, 808, 810, and 812 are non-limiting examples of context-message-response triples mined from one or more sources of conversational data.

FIG. 9 is an exemplary block diagram illustrating biasing responses based on a context that includes a mood of the user. In this example, the response generation engine generates a response to a user message based on the conversational context, which includes a mood of the user. The response generation engine identifies a mood of the user based on context data gathered from a set of sensors.

The mood refers to the emotional state of the user. For example, the mood of the user may be, without limitation, happy, sad, neutral, angry/hostile, cool, anxious, nervous, calm, passionate, impatient, sleepy/tired, or any other emotional state.

The context-sensitive responses are biased in accordance with the mood of the user to make the response more pleasing to the user. For example, if a user is in a happy mood, the response may be a longer response, enthusiastic, or "upbeat" response. If the mood of the user is determined to be a sad or disappointed mood, the response generation engine will generate a context-sensitive response that is brief and more moderate in volume and/or "toned down" to avoid causing displeasure or annoyance to the user.

The mood may be determined based on one or more sources of context data. The user's mood may be determined based on audio data, video data, time of day, temperature, input messages typed by the user, words spoken by the user, gestures made by the user, facial expression, as well as any other types of context data. For example, audio data may be used to determine mood based on the user's voice. The user's mood may be determined based on voice stress, fluctuations in voice, volume, pitch, inflections, or any other factors associated with the user's voice.

In other examples, the mood of the user may also be determined based on visual data. For example, the user's mood may be determined based on facial expression, pupil dilation, body posture, body movements, etc. Mood may also be determined based on words spoken or typed by the user.

In still other examples, mood may be determined based on two or more signals received from two or more sensors. For example, mood may be determined based on a combination of audio data received from an audio sensor, visual data received from one or more cameras, as well as prior messages/statements by the user during the current conversation.

In this non-limiting example, the user mood is neutral. The response generation system generates a response to the user input message 900 based on the context, including the user mood. The response may be generated in real-time or selected from a set of pre-generated responses 902 based on the mood and/or other context data associated with the user.

FIG. 10 is another exemplary block diagram illustrating biasing responses based on a context that includes a mood of the user. In this example, the context data indicates the user mood is happy. The response generation system generates a response to the user generated message 1000. In this non-limiting example, the response generation engine selects the response from a set of pre-generated responses 1002 in accordance with the context, including the user mood. In other embodiments, the response may be generated in real-time.

FIG. 11 is an exemplary block diagram illustrating contextual conditioning of responses by the response generation system. The response generation engine generates a response to a user generated message that is conditioned on the current conversational context 1100 associated with the user. The conversational context may be determined based on time of day, current date, mood of the user, temperature and/or weather, background noises, volume of speaker and/or volume of spoken words, vocal inflections, or any other environmental factors contributing to the context.

Various learning models may be utilized to train the response generation system. In some examples, the response generation engine includes a Recurrent Neural Network Language Model (RLM).

Figure 12:
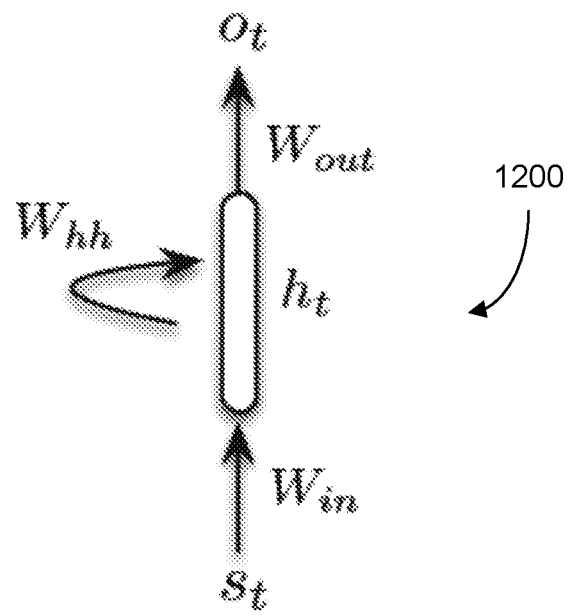
FIG. 12 is an exemplary block diagram illustrating a compact representation of a Recurrent Neural Network Language Model (RLM).

FIG. 12 is an exemplary block diagram illustrating a compact representation of a Recurrent Neural Network Language Model (RLM). The compact representation 1200 in this example is Recurrent Language Model (RLM) architecture. This RLM is a generative model of sentences.

For example, a probability equation associated with the RLM states that given a sentence "s" where $s=s_1, \ldots, s_T$, the RLM based neural network 222 model provides an estimate, such as shown in exemplary Equation (1) below:

$$p(s) = \prod_{t=1}^{T} p(s_t | s_1, \ldots, s_{t-1}) \qquad (1)$$

In this example, the architecture of the RLM machine learning model is parameterized by three weight matrices, an input matrix ($W_{in}$), an output matrix ($W_{out}$), and a recurrent matrix ($W_{hh}$). In some examples, the weight matrices are initialized randomly. The rows of the input matrix contain the K-dimensional embeddings for each word in the language vocabulary of size V.

The vocabulary token and its one-hot representation, that is, a zero vector of dimensionality V, with a 1 corresponding to the index of the token (st). The embedding for the token (st) is then obtained by s>t $W_{in}$. The recurrent matrix shown in exemplary Equation (2) below:

$$W_{hh} \in \mathbb{R}^{K \times K} \qquad (2)$$

keeps a history of the subsequence that has already been processed.

The output matrix shown in exemplary Equation (3) below:

$$W_{out} \in \mathbb{R}^{K \times V} \qquad (3)$$

projects the hidden state ($h_t$) into the output layer ($o_t$), which has an entry for each word in the vocabulary (V). This value is used to generate a probability distribution for the next word in the sequence. Specifically, the forward pass proceeds in exemplary Equation (4) below with the following recurrence, for t=1, . . . , T:

$$h_t \sigma(s_t^T W_{in} + h_{t-1}^T W_{hh}), o_t = h_t^T W_{out} \qquad (4)$$

where σ is a non-linear function applied element-wise, in this case, the logistic sigmoid. The recurrence is seeded by setting $h_0$=0, the zero vector. The probability distribution over the next word given the previous history is obtained by applying the softmax activation function of exemplary Equation (5) below:

$$P(s_t = w | s_1, \ldots, s_{t-1}) = \frac{\exp(o_{tw})}{\sum_{v=1}^{V} \exp(o_{tv})} \qquad (5)$$

Figure 13:
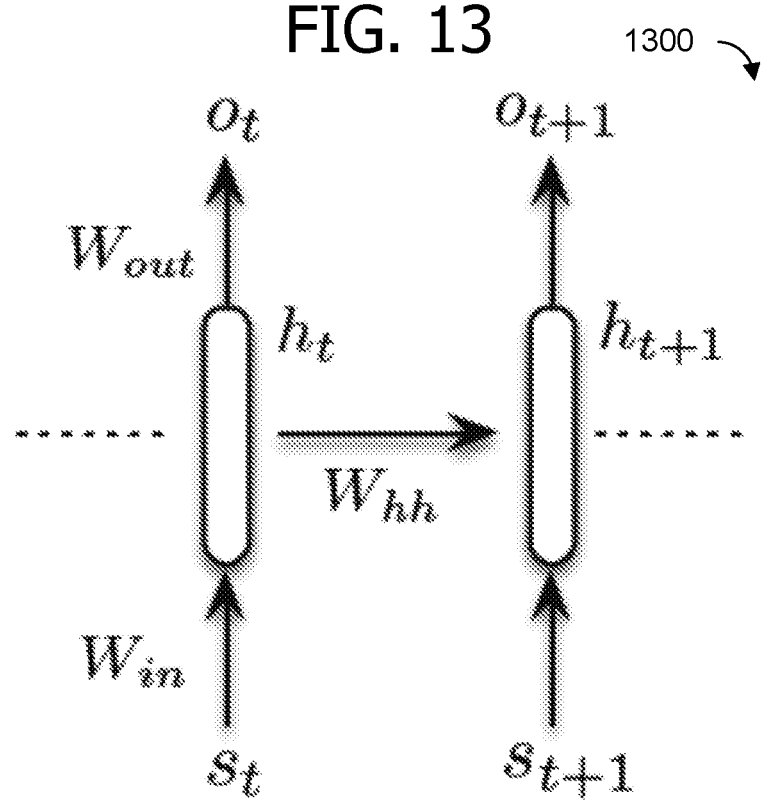
FIG. 13 is an exemplary block diagram illustrating an unrolled representation of an RLM for two time steps.

FIG. 13 is an exemplary block diagram illustrating an unrolled representation of an RLM for two time steps. The unrolled representation 1300 of a Recurrent Language Model (RLM) shows gradients accumulated over multiple time steps during execution of the model. The RLM in the example shown in Equation (6) below is trained to minimize the negative log likelihood of the training sentence:

$$L(s) = -\sum_{t=1}^{T} \log P(s_t | s_1, \ldots, s_{t-1}) \qquad (6)$$

The recurrence is unrolled backwards in time using the back-propagation through time (BPTT) algorithm. Gradients are accumulated over multiple time-steps.

The RLM distinguishes three linguistic entities between two users (user A and user B). These three linguistic entities include the context (c), the message (m), and the response (r). The context (c) represents a sequence of past dialog exchanges of any length. In this example, user B sends a message and user A reacts by formulating a response (r). The response generation engine in this example uses a three context-based generation models to estimate a generation model of the response r, r=$r_1$, . . . , $r_T$, conditioned on past information context and message, shown in Equation (7) below as follows:

$$p(r | c, m) = \prod_{t=1}^{T} p(r_t | r_1, \ldots, r_{t-1}, c, m) \qquad (7)$$

These three machine learning models differ in the manner in which they compose the context-message pair.

In one exemplary RLM machine learning model, dubbed RLMT, the response generation engine training component concatenate each utterance context, message, and response into a single sentence (s) and train the RLM to minimize L(s). The response generation engine computes the probability of the response by performing forward propagation over the known utterances context and message to obtain a hidden state encoding useful information about previous utterances. Subsequently, the response generation engine computes the likelihood of the response from that hidden state. In some examples, the concatenated sentence (s) will be very long on average, especially if the context comprises multiple utterances.

Modeling such long-range dependencies with an RLM may be difficult. Therefore, this RLM may be considered as an additional context-sensitive baseline for the other two exemplary models discussed in FIG. 8 and FIG. 9 below.

Figure 14:
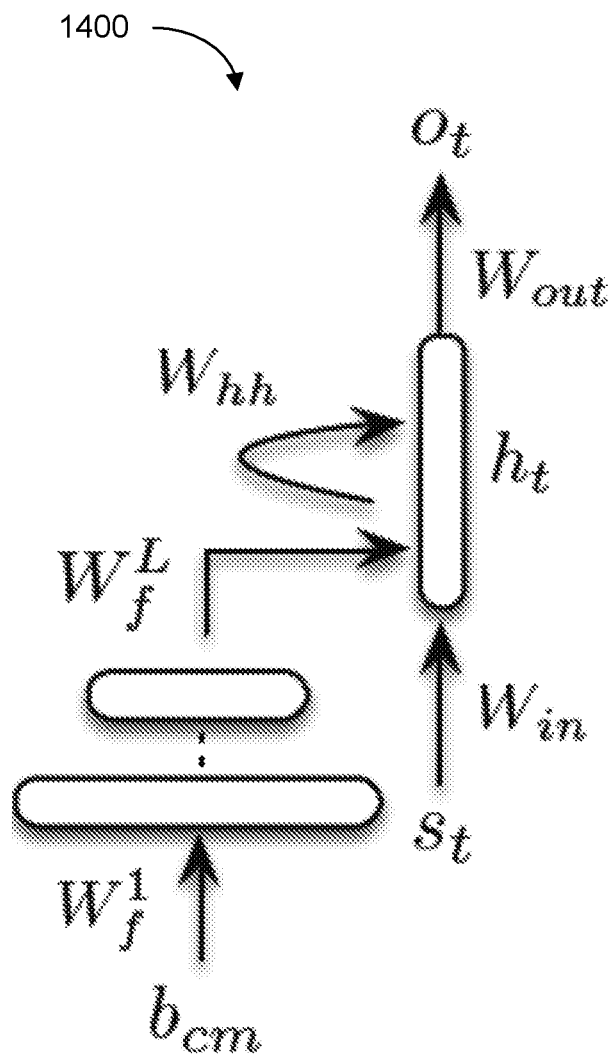
FIG. 14 is an exemplary block diagram illustrating a compact representation of a dynamic context generative neural network model (DCGM).

FIG. 14 is an exemplary block diagram illustrating a compact representation of a dynamic context generative neural network model (DCGM). The compact representation 1400 of a dynamic context generative model includes a decoder RLM that receives a bias from a context encoder. This model strengthens the context bias.

In this example, the context and the message are encoded into a fixed-length vector representation is used by the RLM to decode the response. The context (c) and message (m) are considered as a single sentence and compute a single bag-of-words representation $b_{cm}^2$RV. Then, $b_{cm}$ is provided as input to a multilayered non-linear forward architecture that produces a fixed-length representation that is used to bias the recurrent state of the decoder RLM. At training time, both the context encoder and the RLM decoder are learned so as to minimize the negative log-probability of the generated response. The parameters of the model in exemplary Equation (8) below are:

$$\Theta_{DCGMI} = \{W_{in}, W_{hh}, W_{out}, \{W_f^\ell\}_{\ell=1}^L\} \qquad (8)$$

In this example shown in Equation (9) below, the weights for the L layers of the feed-forward context networks are represented by:

$$\{W_f^\ell\}_{\ell=1}^L \qquad (9)$$

The fixed-length context vector $k_L$, is obtained by forward propagation of the network, as shown in exemplary Equation (10) and exemplary Equation (11) below:

$$k_1 = b_{cm}^T W_f^1 \qquad (10)$$

$$k^\ell = \sigma(k_{-1}^{\ell T} W_f^\ell) \text{ for } \ell = 2, \ldots, L \qquad (11)$$

The rows contain the embeddings of the vocabulary. These are different from those employed in the RLM and play a crucial role in promoting the specialization of the context encoder to a distinct task. The hidden layer of the decoder RLM takes the form shown in exemplary Equation (12), exemplary Equation (13) and exemplary Equation (14) below:

$$h_t = \sigma(h_{t-1}^T W_{hh} + k_L + s_t^T W_{in}) \quad (12)$$

$$o_t = h_t^T W_{out} \quad (13)$$

$$p(s_{t+1}|s_1, \ldots, s_{t-1}, c, m) = \text{softmax}(o_t) \quad (14)$$

This model conditions on previous utterances via biasing the hidden layer state on the context representation $k_L$. The context representation does not change through time. This is useful because it forces the context encoder to produce a representation general enough to be useful for generating all words in the response. This also helps the RLM decoder to remember context information when generating long responses.

Figure 15:
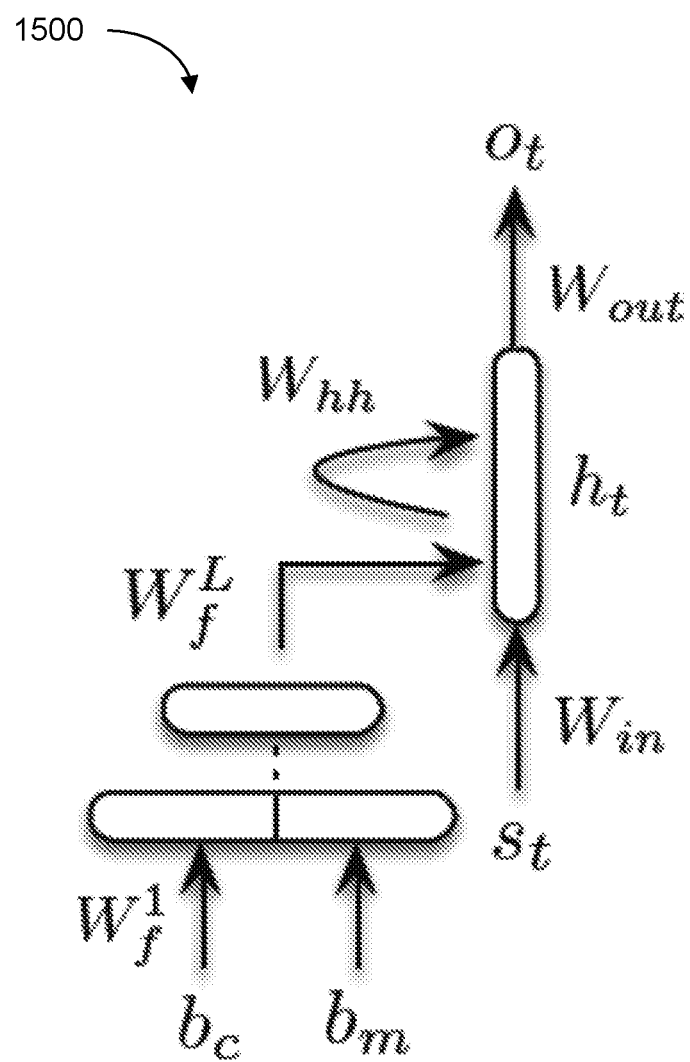
FIG. 15 is an exemplary block diagram illustrating a compact representation of a DCGM concatenating representations of the context and message to preserve order.

FIG. 15 is an exemplary block diagram illustrating a compact representation of a DCGM learning model. In this example, the response generation engine includes the DCGM learning model that concatenates representations of context and message for context-sensitive response generation.

The DCGM model 1500 in this example does not distinguish between context and message because this has the propensity to underestimate the strong dependency that holds between message and response. In this example, the model concatenates the two linear mappings of the bag-of-words representations $b_c$ and $b_m$ in the input layer of the feed-forward network representing context and message. Concatenating continuous representations prior to deep architectures is a common strategy to obtain order-sensitive representations. Example forward Equation (15) and Equation (16) for the context encoder are shown below:

$$k_1 = [b_c^T W_f^1, b_m^T W_f^1], \quad (15)$$

$$k_\ell = \sigma(k_{\ell-1}^T W_f^\ell) \text{ for } \ell = 2, \ldots, L \quad (16)$$

where the notation [x, y] denotes the concatenation of x and y vectors.

In this exemplary model, the bias on the recurrent hidden state and the probability distribution over the next token are computed as described above in FIG. 14.

The context-sensitive response generation engine models outperform machine translation and information retrieval based systems. The context-sensitive response generation engine has improved capacity to retain contextual information and thus achieves similar performance to information retrieval and context message matching despite their lack of exact n-gram match information.

Thus, in some examples, the response generation engine includes neural network architecture for data-driven response generation trained from social media conversations. In these examples, generation of responses is conditioned on past dialog utterances that provide contextual information. However, in other examples, generation of responses is conditioned on past dialog utterances as well as non-linguistic context data derived from sensor data and/or user data.

Context-sensitive response generation utilizing machine learning models produces context-sensitive responses that are more accurate and appropriate than responses generated in accordance with information retrieval (IR) and/or machine translation (MT) techniques alone, as shown in FIG. 15-FIG. 21 below.

Figure 16:
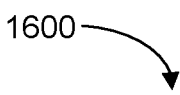
FIG. 16 is a table illustrating context-sensitive ranking results on machine translation.

FIG. 16 is a table illustrating context-sensitive ranking results on machine translation. Table 1600 illustrates context-sensitive ranking results on machine translation where n=1000. The subscript "feat" indicates the number of features of the model. The log-linear weights are estimated by running a single iteration of MERT. The table shows positive (+) or negative (−) percent (%) improvements with respect to the reference system 1602.

Figure 17:
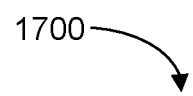
FIG. 17 is a table illustrating context-sensitive ranking results on information retrieval.

FIG. 17 is a table illustrating context-sensitive ranking results on information retrieval. Table 1700 is a context-sensitive ranking of results from an information retrieval system and the context-sensitive neural network models. Table 1500 and table 1700 indicate that a phrase-based machine translation decoder outperforms a purely information retrieval approach. Adding context sensitivity (CMM) features to the system helps. The neural network models contribute measurably to improvement. The neural network models (DCGM) outperform baselines. The context-sensitive, neural network model (DCGM provides more consistent gains than the RLMT models.

Figure 18:
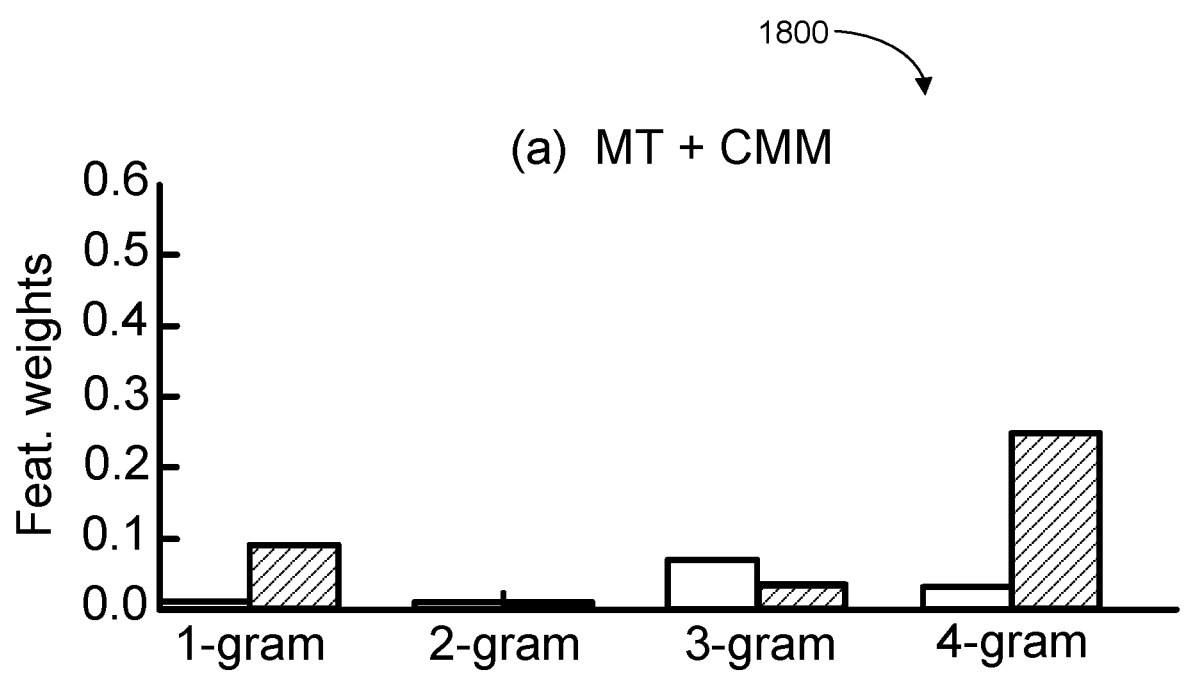
FIG. 18 is a bar graph illustrating the weights of learned context-message model features with machine translation techniques.

FIG. 18 is a bar graph illustrating the weights of learned context-message model features with machine translation techniques. Bar graph 1800 is a comparison of weights of learned context-sensitivity (CMM) features for machine translation systems. Bar graph 1800 indicates the performance gain for phrase-based statistical patterns captured by machine translation systems comes primarily from context matches.

Figure 19:
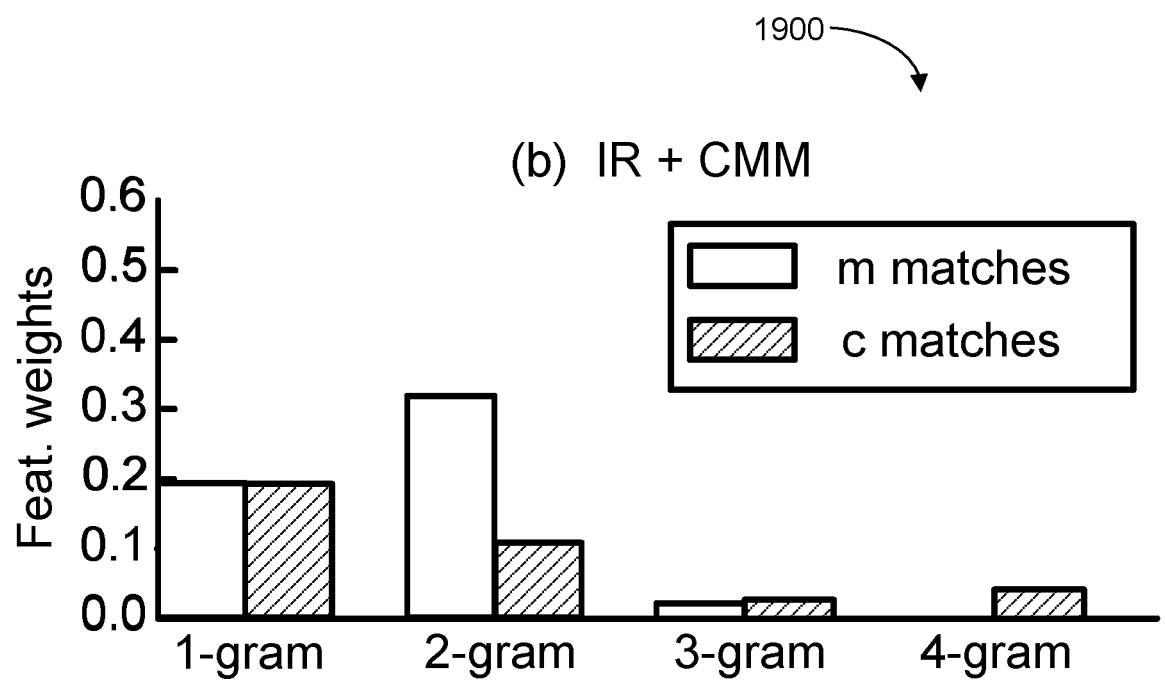
FIG. 19 is a bar graph illustrating the weights of learned context-message model features with information retrieval.

FIG. 19 is a bar graph illustrating the weights of learned context-message model features with information retrieval. Bar graph 1900 shows a comparison of weights of learned context-sensitive (CMM) features for information retrieval (IR). In the IR case, the matches between message and response are particularly important and context matches help in providing additional gains.

Figure 20:
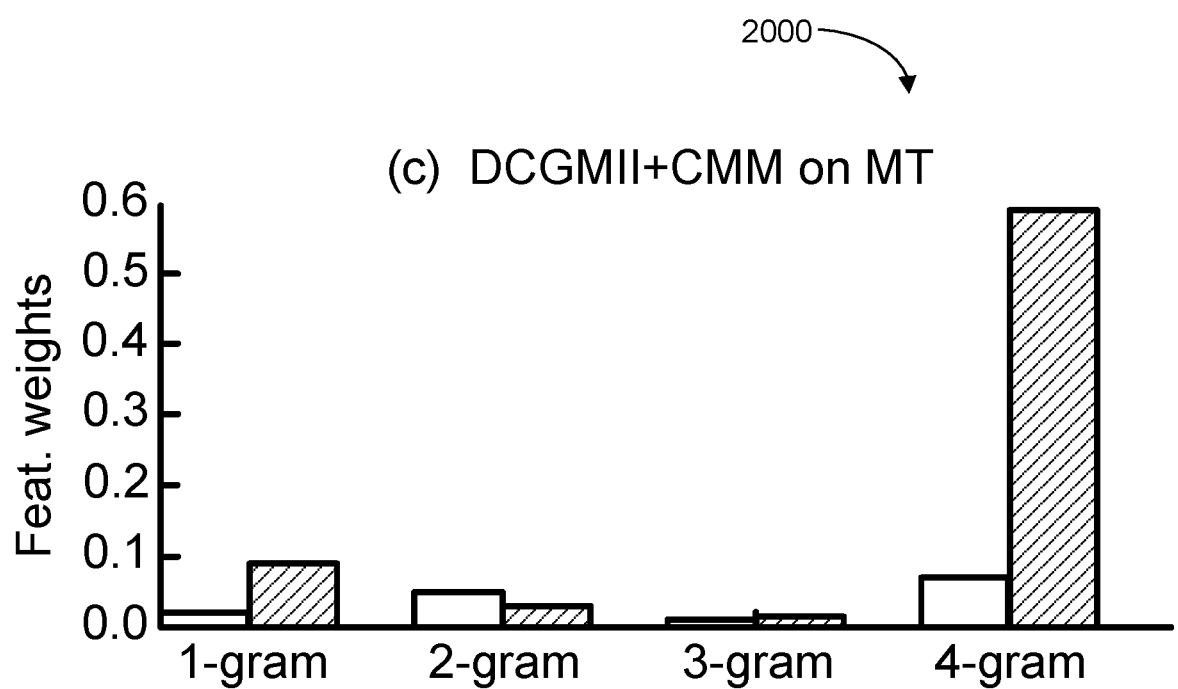
FIG. 20 is a bar graph illustrating the weights of learned context-message model features with a first dynamic context generative model.

FIG. 20 is a bar graph illustrating the weights of learned context-message model features with a first dynamic context generative model. Bar graph 2000 shows a comparison of the weights of the learned context-sensitive (CMM) features for neural network model (DGGM) on machine translation (MT). The DCGM models appear to have better capacity to retain contextual information and thus achieve similar performance to IR plus CMM despite their lack of exact n-gram match information. Bar graph 2000 shows that 1-gram matches are explained away by the DGCM model, but that higher order matches are important. DCGM models are improved by preserving word-order information in context and message encodings.

Figure 21:
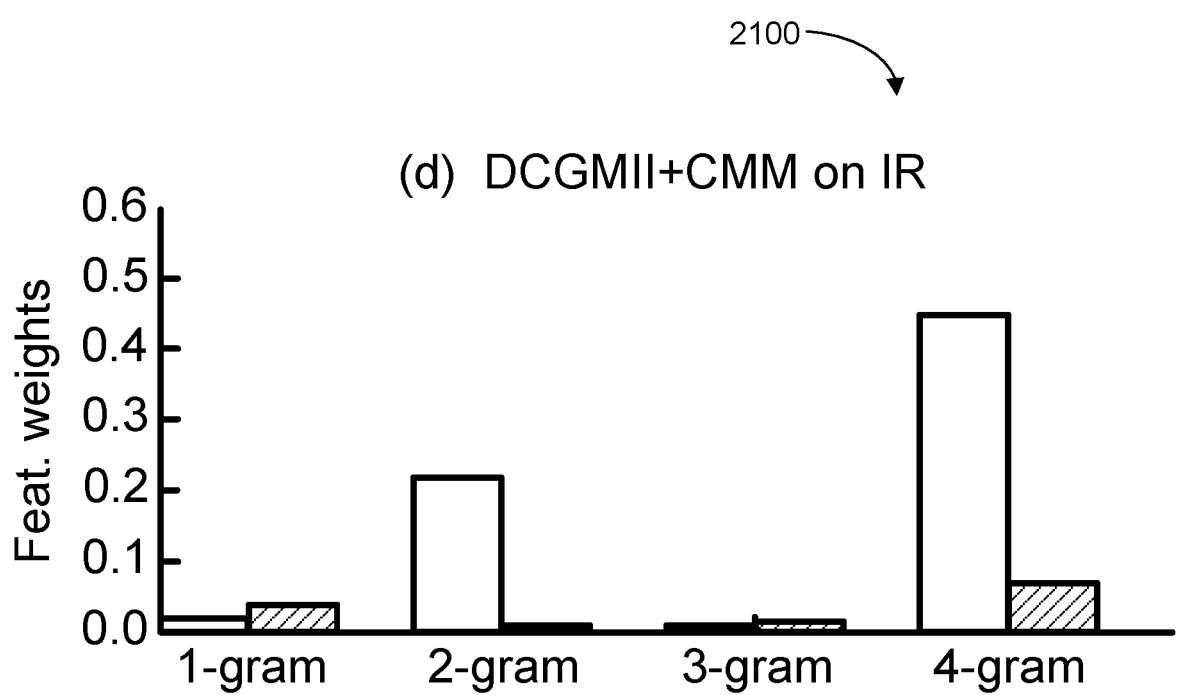
FIG. 21 is a bar graph illustrating the weights of learned context-message model features with a second dynamic context generative model.

FIG. 21 is a bar graph illustrating the weights of learned context-message model features with a second dynamic context generative model. Bar graph 2100 shows a comparison of weights of learned CMM features for neural network models (DCGMII) on information retrieval (IR). Bar graph 2100 shows that neural network models outperform both machine translation and information retrieval based systems. The neural network models have better capacity to retain contextual information and thus achieve similar performance to IR plus CMM despite their lack of exact n-gram match information in this example.

Figure 22:
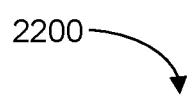
FIG. 22 is a table illustrating evaluation scores for performance of response generation systems.

FIG. 22 is a table illustrating evaluation scores for performance of response generation systems. Table 2200 shows pair-wise human evaluation scores between a system A and a system B. The set of results refer to the MT hypothesis list. The asterisk means agreement between human preference and MT rankings. Table 2200 gives the results of human evaluation, giving the different in mean scores between systems and 95% confidence intervals generated using the Welch t-test.

As shown in table 2200, context-sensitive systems outperform non-context sensitive systems with preference gains as high as approximately 5.3% in the case of DCGM-II+ CMM versus MT. Similarly, context-sensitive DCGM systems outperform non-context-sensitive systems by 1.5% for MT and 2.3% for IR.

Figure 23:
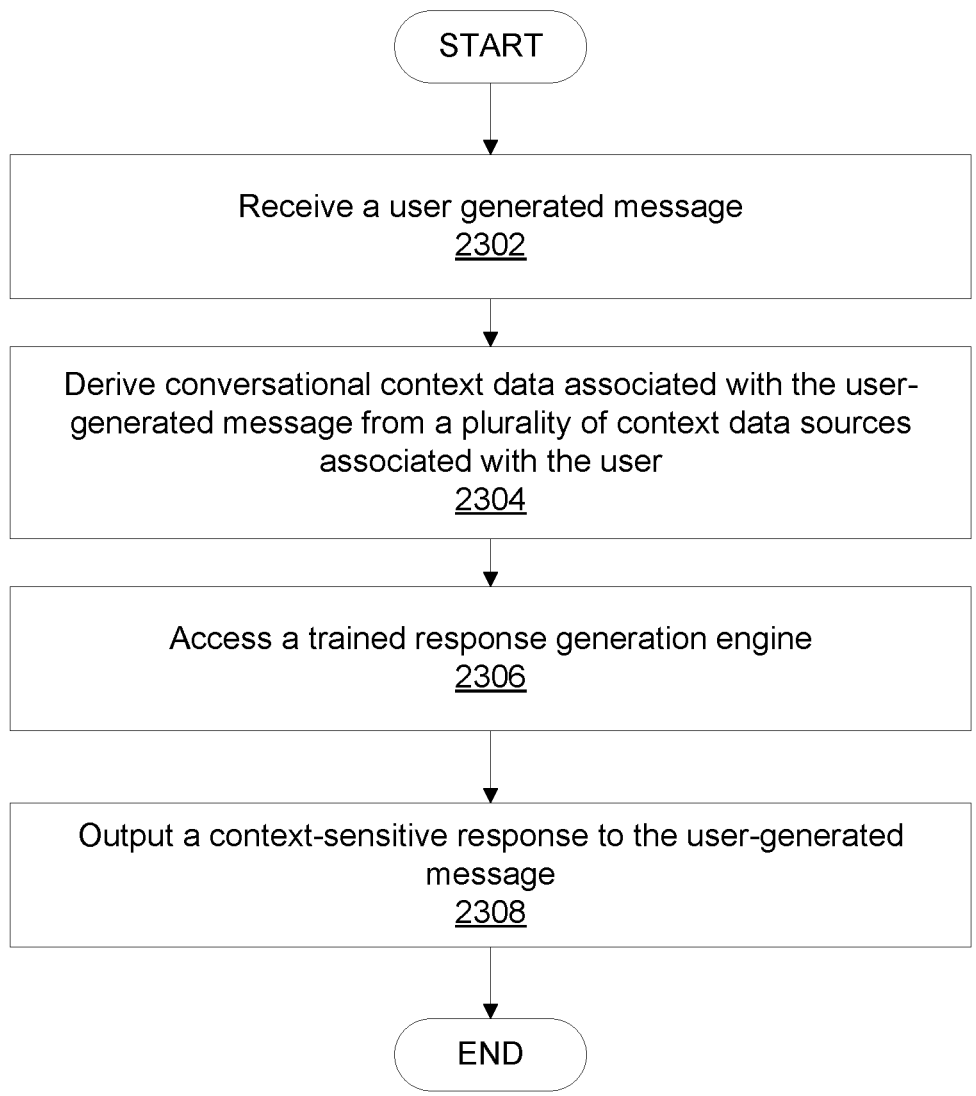
FIG. 23 is a flow chart illustrating operation of the computing device to generate a response based on conversational context data.

FIG. 23 is a flow chart illustrating operation of the computing device to generate a response based on conversational context data. The process depicted in FIG. 23 may be implemented by a computing device, such as, but without limitation, computing device 102 in FIG. 1 and/or user device 302 in FIG. 3.

The process begins by receiving a user generated message at 2302. Conversational context data associated with the user generated message is derived from a plurality of context data sources associated with the user at 2304. A trained response generation engine is accessed at 2306. A context-sensitive response to the user generated message is output to the user at 2308 with the process terminating thereafter.

In this example, the response output to the user is selected form a database of pre-generated responses. However, in other examples, the response is generated dynamically during runtime.

Figure 24:
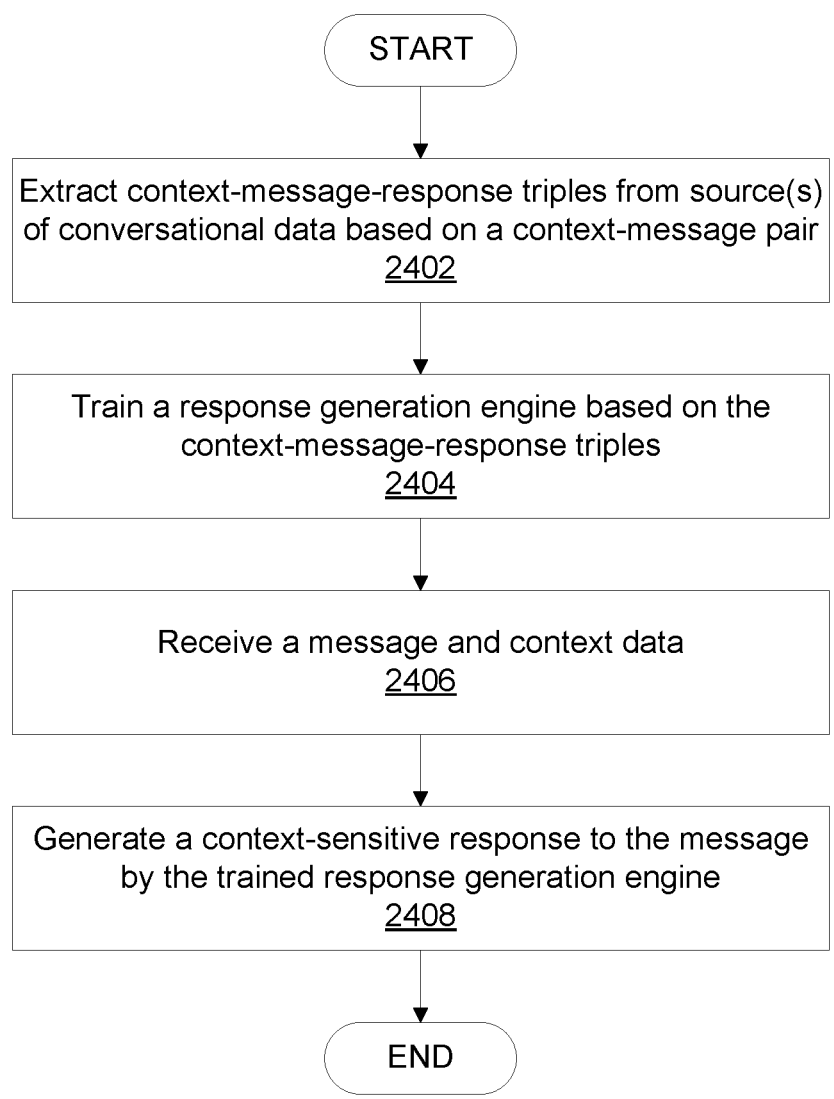
FIG. 24 is a flow chart illustrating operation of the computing device to generate a response by a trained response generation engine.

FIG. 24 is a flow chart illustrating operation of the computing device to generate a response by a trained response generation engine. The process depicted in FIG. 24 may be implemented by a computing device, such as, but without limitation, computing device 102 in FIG. 1 and/or user device 302 in FIG. 3.

The process begins by extracting context-message-response triples from one or more source(s) of conversational data based on a context-message pair at 2402. A response generation engine is trained based on the context-message-response triples at 2404. A message and context data are received at 2406 by the trained response generation engine. A context-sensitive response to the message is generated by the trained response generation engine at 2408 with the process terminating thereafter.

Thus, use of context in building a context-sensitive response generation engine eliminates the need to explicitly track the local state of the interaction in order to generate or select the response. The response generation engine exploits context learned from social media data in generating conversational responses and/or in retrieving pre-generated conversational responses.

Figure 25:
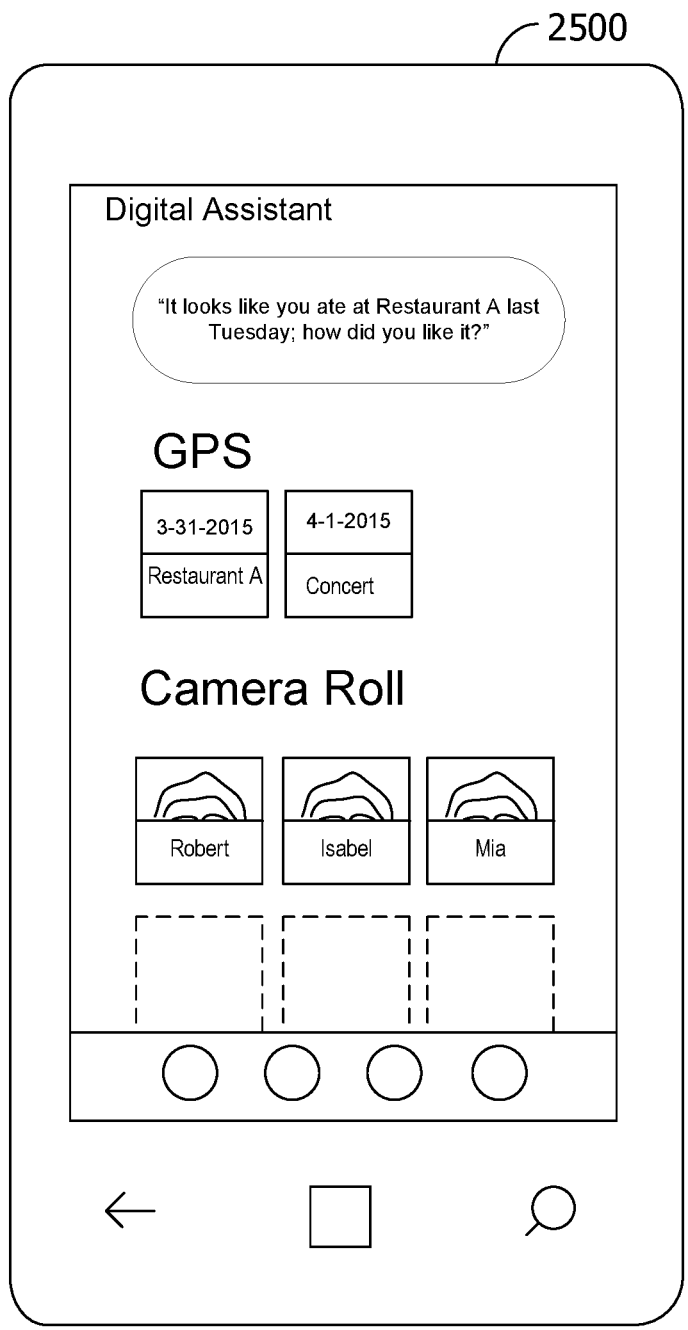
FIG. 25 is an exemplary block diagram illustrating a digital assistant.

FIG. 25 is an exemplary block diagram illustrating a digital assistant. Digital assistant 2500 is a device for managing personal information of a user. The digital assistant 2500 may include a set of sensors, such as one or more cameras, a GPS, audio sensors, a touch screen, a temperature sensor, a pressure sensor, an orientation sensor, as well as any other types of sensors. The digital assistant 2500 includes a response generation system that is capable of receiving user generated input messages and generating natural language output responses. The digital assistant 2500 may generate output responses in one or more formats, including text responses, audio responses, graphical responses, or any other types of responses.

Additional Examples

In some examples, a neural network model for response generation is trained on context-message-response triples extracted from social media. The neural network is used in conjunction with a statistical machine translation phrase table, such as a database of phrasal mappings, or information retrieval from a database of conversations. In other examples, the response generation engine is used to generate context-sensitive responses without statistical machine translation phrase tables and without information retrieval from a database of conversations.

In still other examples, the response generation engine includes a neural network to capture context directly when generating conversational responses, either in conjunction with statistical machine translation based models or directly. In yet another example, the response generation engine may utilize neural networks to capture context directly when retrieving conversational responses from a database of pre-generated responses.

In still other examples, the response generation engine may utilize Long-Short Term Memories (LSTM) in response generation.

At least a portion of the functionality of the various elements in FIG. 1 and FIG. 2 may be performed by other elements in FIG. 1 and FIG. 2, or an entity (e.g., processor, web service, server, application program, computing device, etc.) not shown in FIG. 1 or FIG. 2

In some examples, the operations illustrated in FIG. 1, FIG. 2, FIG. 3, and FIG. 4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "BLUETOOTH" as used herein refers, in some examples, to a wireless technology standard for exchanging data over short distances using short wavelength radio transmission.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), health monitors, physical activity monitors, network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating context-sensitive conversational responses. For example, the elements illustrated in FIG. 1 and FIG. 2, such as when encoded to perform the operations illustrated in FIG. 22, FIG. 23, and FIG. 24, constitute exemplary means for extracting context-message-response triples from conversational data sources, exemplary means for deriving conversational context data from sources of context data associated with a user, and exemplary means for generating a context-sensitive response to a user input message.

Alternatively or in addition to the other examples described herein, examples include any combination of the following:

selecting context-message-response n-tuples from a plurality of context-message-response triples corresponding to a selected context-message data pair, wherein each context-message-response triples comprises a human-generated message, a conversational context, and a reference response corresponding to the human-generated message; and training the response generation engine in a context-sensitive manner using the selected context-message-response n-tuples to form a trained response generation engine extracting the context-message-response triples from at least one social media source in a context-sensitive manner, wherein the context-message-response triples are identified for extraction based on a selected context-message data pair, wherein the at least one social media source provides the conversational data in at least one format, wherein a format of the conversational data comprises at least one of a text format, an audio format, or a visual format generating the context-sensitive response to the user generated message further comprises: generating the context-sensitive response to the user generated message in real-time during the current conversation based on the conversational context data and the user generated response the conversational context data comprises linguistic context data, the linguistic context data comprising message and response data pairs preceding the user generated message within the current conversation deriving conversational context data further comprises capturing non-linguistic context data from a set of sensors associated with the user in real-time, wherein the set of sensors comprises at least one of a camera, an audio sensor, a global positioning system (GPS) sensor, an infrared sensor, a pressure sensor, a motion sensor, an orientation sensor, temperature sensor, medical sensor, physical activity sensor, or speed sensor the conversational context data further comprises non-linguistic data, and wherein deriving conversational context data further comprises accessing the non-linguistic context data from a set of user data, the non-linguistic context data comprising at least one of preferences data, contacts data, health data, interests data, user activity data, calendar data, activities data, work data, hobby data, or daily routine data the response generation engine comprises a machine learning model the machine learning model includes a neural network an extraction component, wherein the at least one processor further executes the extraction component to identify context-message-response n-tuples from a plurality of context-message-response n-tuples corresponding to a selected context-message data pair, wherein the plurality of context-message-response n-tuples are extracted from at least one source of conversational data; select the identified context-message-response n-tuples from the plurality of context-message-response n-tuples, wherein each context-message-response n-tuples comprises a human-generated message, and a reference response corresponding to the human-generated message; and train the response generation engine in a context-sensitive manner using the selected context-message-response n-tuples to form a trained response generation engine extract the context-message-response n-tuples from at least one social media source, wherein the at least one social media source provides the conversational data in at least one format, wherein a format of the conversational data comprises at least one of a text format, an audio format, or a visual format a context data derivation component, wherein the at least one processor further executes the context data derivation component to derive the linguistic context data from conversation history data, wherein the conversation history data comprises prior message and response pairs occurring within the current conversation a context data derivation component, wherein the at least one processor further executes the context data derivation component to capture non-linguistic context data from a set of sensors associated with the user in real-time, wherein the set of sensors comprises at least one of a camera, an audio sensor, a global positioning system (GPS) sensor, an infrared sensor, a pressure sensor, a motion sensor, an orientation sensor, temperature sensor, or speed sensor, wherein the context data derivation component provides the conversational context data to the response generation engine a context data derivation component, wherein the at least one processor further executes the context data derivation component to access the non-linguistic context data from a set of user data, the non-linguistic context data comprising at least one of preferences data, contacts data, health data, interests data, user activity data, calendar data, activities data, work data, hobby data, or daily routine data the response generation engine is a machine learning model the at least one source of conversational data comprises a social media source, wherein the social media source provides conversational data in at least one format, wherein a format of the conversational data comprises at least one of a text format, an audio format, or a visual format the conversational context data comprises linguistic context data and non-linguistic data the response generation engine comprises a machine learning model.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating context-sensitive conversational responses, said system comprising:
    at least one processor;
    a memory storage device, the memory storage device comprising a memory area storing a response generation engine, wherein the at least one processor executes the response generation engine to:
        receive a user generated message associated with a current conversation;
        derive conversational context data associated with the user generated message, wherein the derived conversational context data is based at least on a set of context data sources associated with a user, the set of context data sources comprising:
            linguistic context data captured as message-response pairs of a conversation of the user, and
            non-linguistic context data associated with a physical or virtual environment of the user; and
        output a generated context-sensitive response to the user generated message based at least on the conversational context data and the user generated message.

2. The system of claim 1, further comprising:
    an extraction component, wherein the at least one processor further executes the extraction component to:
        select context-message-response n-tuples corresponding to a selected context-message data pair, wherein the context-message-response n-tuples are extracted from at least one source of conversational data, wherein a context-message-response n-tuple comprises a human-generated message and a reference response corresponding to the human-generated message; and
        train the response generation engine in a context-sensitive manner using the selected context-message-response n-tuples to form a trained response generation engine.

3. The system of claim 2, wherein the at least one processor further executes the extraction component to:
    extract the context-message-response n-tuples from at least one social media source, wherein the at least one social media source provides the conversational context data in at least one format, wherein a format of the conversational data comprises at least one of a text format, an audio format, or a visual format.

4. The system of claim 1, further comprising:
    a context data derivation component, wherein the at least one processor further executes the context data derivation component to:
        derive the linguistic context data from conversation history data, wherein the conversation history data comprises prior message and response pairs occurring within the current conversation.

5. The system of claim 1, further comprising:
    a context data derivation component, wherein the at least one processor further executes the context data derivation component to:
        derive non-linguistic context data from sensor data received in real-time from a set of sensors, wherein the set of sensors comprises at least one of a camera, an audio sensor, a global positioning system (GPS) sensor, an infrared sensor, a pressure sensor, a motion sensor, an orientation sensor, temperature sensor, or speed sensor, wherein the context data derivation component provides the conversational context data to the response generation engine.

6. The system of claim 1 further comprising:
    a context data derivation component, wherein the at least one processor further executes the context data derivation component to:
        access the non-linguistic context data from a set of user data, the non-linguistic context data comprising at least one of preferences data, contacts data, health data, interest data, user activity data, calendar data, activities data, work data, hobby data, or daily routine data.

7. The system of claim 1, wherein the response generation engine comprises a machine learning model.

8. One or more computer storage media having computer-executable components, said components comprising:
   an extraction component that is executed to cause at least one processor to extract context-message-response n-tuples from at least one source of conversational data based on a context-message pair to form a training set of context-message-response n-tuples;
   a response generation training component that is executed to cause at least one processor to train a response generation engine using the training set of context-message-response n-tuples to form a trained response generation engine; and
   the trained response generation engine that is executed to cause at least one processor to generate a context-sensitive conversational response to a user generated message based on conversational context data associated with a user, the conversational context data being gathered during a current conversation, wherein the conversational context data is based at least on a set of context data sources associated with a user, the set of context data sources comprising:
      linguistic context data captured as context-message-response n-tuples of a conversation of the user, and
      non-linguistic context data associated with a physical or virtual environment of the user.

9. The computer storage media of claim 8, wherein the at least one source of conversational data comprises a social media source, wherein the social media source provides conversational data in at least one format, wherein a format of the conversational data comprises at least one of a text format, an audio format, or a visual format.

10. The computer storage media of claim 8, wherein the response generation engine comprises a machine learning model.

11. A computer-implemented method for state-free generation of context-sensitive conversational responses, said method comprising:
   receiving, by a response generation engine implemented on a processor, a user generated message associated with a current conversation;
   deriving, by a context data derivation component implemented on the processor, conversational context data associated with the user generated message, wherein the derived conversational context data is based at least on a set of context data sources associated with a user, the set of context data sources comprising:
      linguistic context data captured as message-response pairs of a conversation of the user, and
      non-linguistic context data associated with a physical or virtual environment of-the user; and
   outputting a generated context-sensitive response to the user generated message based at least on the conversational context data and the user generated message.

12. The computer-implemented method of claim 11, further comprising:
   selecting, by an extraction component, context-message-response n-tuples corresponding to a selected context-message data pair, wherein the context-message-response n-tuples are extracted from at least one source of conversational data, wherein a context-message-response n-tuple comprises a human-generated message and a reference response corresponding to the human-generated message; and
   training the response generation engine in a context-sensitive manner using the selected context-message-response n-tuples to form a trained response generation engine.

13. The computer-implemented method of claim 12, wherein the at least one source of conversational data comprises a social media source, wherein the social media source provides conversational data in at least one format, wherein a format of the conversational data comprises at least one of a text format, an audio format, or a visual format.

14. The computer-implemented method of claim 12, further comprising:
   extracting, by the extraction component, the context-message-response n-tuples from at least one social media source, wherein the at least one social media source provides the conversational context data in at least one format, wherein a format of the conversational data comprises at least one of a text format, an audio format, or a visual format.

15. The computer-implemented method of claim 11, further comprising:
   deriving, by a context data driven derivation component, the linguistic context data from conversation history data, wherein the conversation history data comprises prior message and response pairs occurring within the current conversation.

16. The computer-implemented method of claim 11, further comprising:
   deriving, by a context data driven derivation component, the non-linguistic context data from sensor data received in real-time from a set of sensors, wherein the set of sensors comprises at least one of a camera, an audio sensor, a global positioning system (GPS) sensor, an infrared sensor, a pressure sensor, a motion sensor, an orientation sensor, temperature sensor, or speed sensor, wherein the context data derivation component provides the conversational context data to the response generation engine.

17. The computer-implemented method of claim 11, further comprising:
   accessing, by the context data derivation component, the non-linguistic context data from a set of user data, the non-linguistic context data comprising at least one of preferences data, contacts data, health data, interest data, user activity data, calendar data, activities data, work data, hobby data, or daily routine data.

18. The computer-implemented method of claim 11, wherein the response generation engine comprises a machine learning model.

19. The computer-implemented method of claim 18, wherein the machine learning model includes a neural network.

20. The system of claim 7, wherein the machine learning model includes a neural network.

* * * * *